(12) United States Patent
Bair et al.

(10) Patent No.: US 7,869,204 B2
(45) Date of Patent: Jan. 11, 2011

(54) COMPACT SIZE PORTABLE COMPUTER HAVING A FULLY INTEGRATED VIRTUAL KEYBOARD PROJECTOR AND A DISPLAY PROJECTOR

(75) Inventors: Courtney S. Bair, Boulder, CO (US); Eric R. Kern, Chapel Hill, NC (US)

(73) Assignee: International Business Machines Corporation, Armonk, NY (US)

(*) Notice: Subject to any disclaimer, the term of this patent is extended or adjusted under 35 U.S.C. 154(b) by 137 days.

(21) Appl. No.: 12/210,767

(22) Filed: Sep. 15, 2008

(65) Prior Publication Data

US 2010/0067181 A1 Mar. 18, 2010

(51) Int. Cl.
*G06F 1/16* (2006.01)
(52) U.S. Cl. ............ 361/679.3; 403/327; 417/554; 285/382.7
(58) Field of Classification Search ............ 361/679.21, 361/679.25, 679, 27; 403/327; 439/359, 439/404, 607.02; 417/554; 285/93, 26, 382.7; 345/1.1, 84; 353/119
See application file for complete search history.

(56) References Cited

U.S. PATENT DOCUMENTS

| 5,483,250 | A | 1/1996 | Herrick |
|---|---|---|---|
| 6,525,750 | B1 | 2/2003 | Knox |
| 6,611,252 | B1 | 8/2003 | DuFaux |
| 6,806,850 | B2 | 10/2004 | Chen |
| 6,930,669 | B2 | 8/2005 | Weiner et al. |
| 7,215,327 | B2 | 5/2007 | Liu et al. |
| 2002/0118151 | A1* | 8/2002 | Chen ........................... 345/84 |
| 2005/0280786 | A1* | 12/2005 | Moiroux et al. ............. 353/119 |
| 2008/0024388 | A1* | 1/2008 | Bruce ........................ 345/1.1 |

OTHER PUBLICATIONS http://www.newlaunches.com/archives/sony_develops_smallest_led_projector.php, Aug. 7, 2008, pp. 1-5.
http://www.virtual-laser-keyboard.com/demo.asp, Aug. 7, 2008, 1-3.
Rossmuller, N., http://www.ces-show.com/0054/3m/accessories/mobile-phone-projector, Jan. 4, 2008, pp. 1-4.

* cited by examiner

*Primary Examiner*—Hung V Duong
(74) *Attorney, Agent, or Firm*—Arthur J. Samodovitz; Silvy Anna Murphy

(57) ABSTRACT

A computer with a fully integrated virtual keyboard projector and a display projector. The computer includes a base having a CPU, a video card and memory, a screen pivotally mounted to one side of the base, and a display projector mounted to an opposite side of the base and angled to project a computer generated image onto the screen. Further, the computer includes a keyboard projector mounted to the opposite side of the base to project a keyboard onto a surface adjacent to the opposite side of the base. Further, the computer includes another display projector mounted to the opposite side of the base and digitally synchronized with the first display projector for projecting a superimposed image.

22 Claims, 17 Drawing Sheets

COMPACT SIZE PORTABLE COMPUTER HAVING A FULLY INTEGRATED VIRTUAL KEYBOARD PROJECTOR AND A DISPLAY PROJECTOR

FIELD OF THE INVENTION

The present invention relates to portable computers, and more specifically to a compact size portable personal computing device having a fully integrated display projector and a virtual keyboard projector.

BACKGROUND OF THE INVENTION

Today there are a whole variety of personal mobile devices, such as, cellular phones, PDA (Personal Digital Assistant) devices, etc. that enable users to send electronic mail messages and view the Internet from these personal mobile devices. However, these personal mobile devices do not provide functionality comparable to that of personal portable computers. As such, there is a need for innovative ways to provide a full-functioning portable computer that is convenient to carry.

SUMMARY OF THE INVENTION

The present invention resides in a compact size portable personal computing device having a fully integrated display projector and a virtual keyboard projector. In an embodiment, the compact size portable personal computing device includes a processing unit for processing one or more program instructions, a video card for receiving one or more video signals, a display having an opened up state for viewing information from the compact portable computing device, the display having a closed down state for porting the computing device. Further, the computing device includes a first projection system for projecting an input image for inputting data into the compact portable computing device, the first projection system projecting the input image in a downward direction in an area proximate to a front of the compact portable computing device when the display is in the opened up state and a second projection system for projecting an output image onto the display of the compact portable computing device in the opened up state for viewing the output image, the second projection system projecting the output image in an upward direction and onto the display in the opened up state, wherein the processing unit changes the output image projected onto the display responsive to the one or more video signals received by the video card and the data inputted into the compact portable computing device using the input image. In an embodiment, the computing device further includes a third projection system for projecting the output image onto the display of the compact portable computing device in the opened up state, the third projection system projecting the output image in the upward direction and onto the display in the opened up state, wherein the third projection system projects the output image in the upward direction in synchronization with the second projection system, and wherein the second projection system and the third projection system maintain a focused display of the output image onto the display. In one embodiment, the display includes a single panel screen that is rotatably connected to a base portion of the compact portable computing device. In another embodiment, the display comprises a foldable display that includes a first panel and a second panel, where the first panel is rotatably connected to a base portion of the compact portable computing device, where the second panel is rotatably connected at a top edge of the first panel, the top edge of the first panel being distal from the base portion of the compact portable computing device, where when the foldable display is in the opened up state, each of the first panel and the second panel is substantially perpendicular to the base portion of the compact portable computing device, and where when the foldable display is in the closed up state, the second panel folds onto the first panel, and the first panel having the second panel folded thereon, folds onto the base portion of the compact portable computing device. Further, in an embodiment, the foldable display is unlatched and lifted to a position substantially perpendicular to the base portion, where the second panel is lifted upwards from the first panel to match an angle that the first panel of the foldable display forms with the base portion of the compact portable computing device, and where the foldable display is slidably mounted within the base portion to provide an extended display position and a retracted display position, the foldable display component being distanced from the base portion in the extended display position, and the foldable display component being proximate to the base portion in the retracted display position. In an embodiment, the single screen panel is lifted upwards from the base portion to a position substantially perpendicular to the base portion and where the single screen panel is slidably mounted within the base portion to provide an extended display position and a retracted display position, the single screen panel being distanced from the base portion in the extended display position, and the single screen panel being proximate to the base portion in the retracted display position. In an embodiment, the first projection system is mounted onto the base portion of the compact portable computing device, and where the first projection system comprises an optical element for projecting the input image comprising a virtual laser keyboard image for inputting the data into the compact portable computing device, where the optical element comprises at least one of: a laser diode and a LED (Light Emitting Diode) emitter. In an embodiment, each of the second projection system and the third projection system is mounted onto the base portion of the compact portable computing device, and where each of the second projection system and the third projection system comprises an optical element for projecting the output image onto the display, where the optical element comprises at least one of: a tricolor LED (Light Emitting Diode) emitter and a tricolor laser diode.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

Figure 1A:
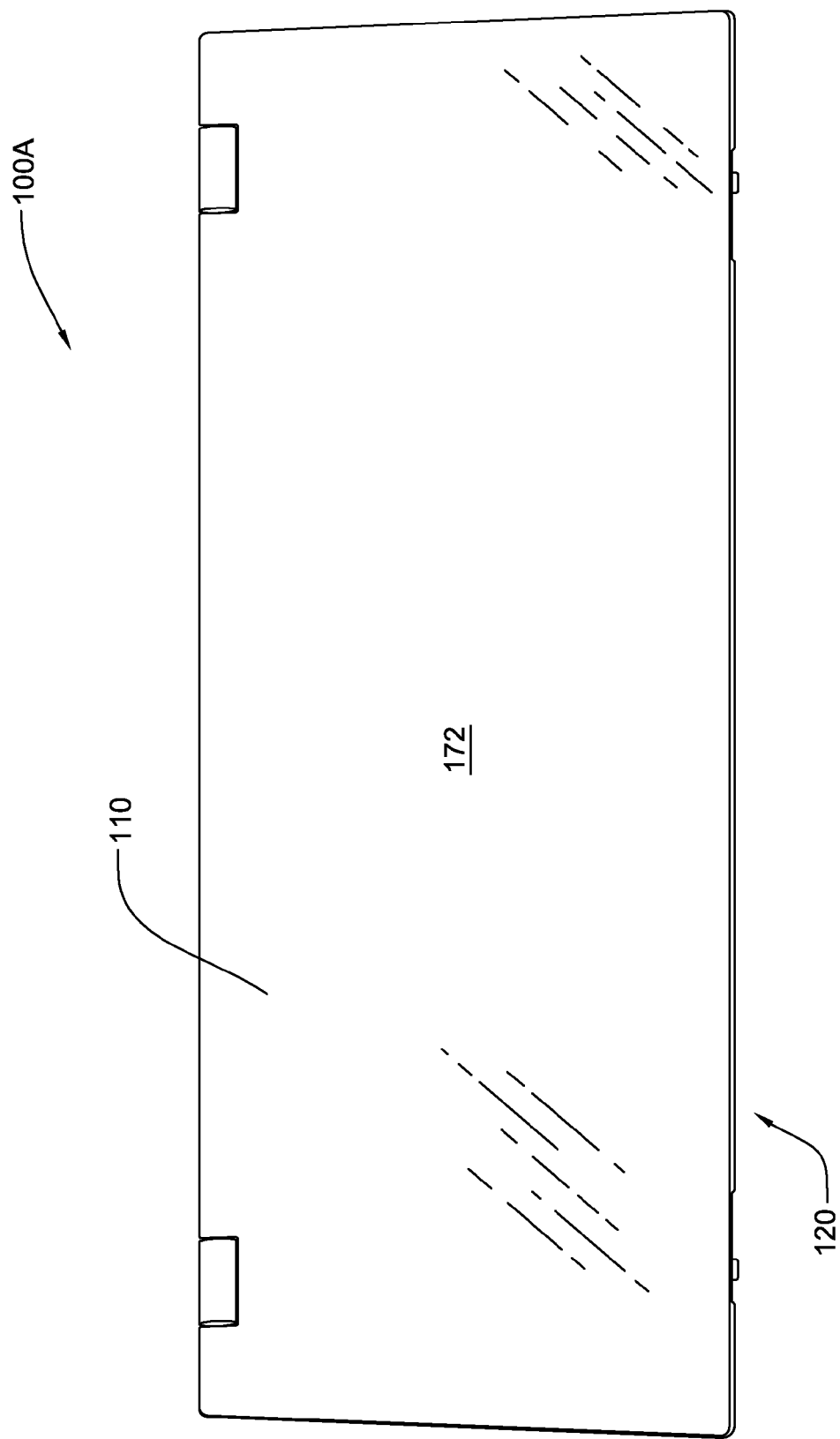
FIG. 1A depicts a closed perspective view of a compact laptop computer having a display projection system and a keyboard projection system, in accordance with an embodiment of the invention.
Figure 1B:
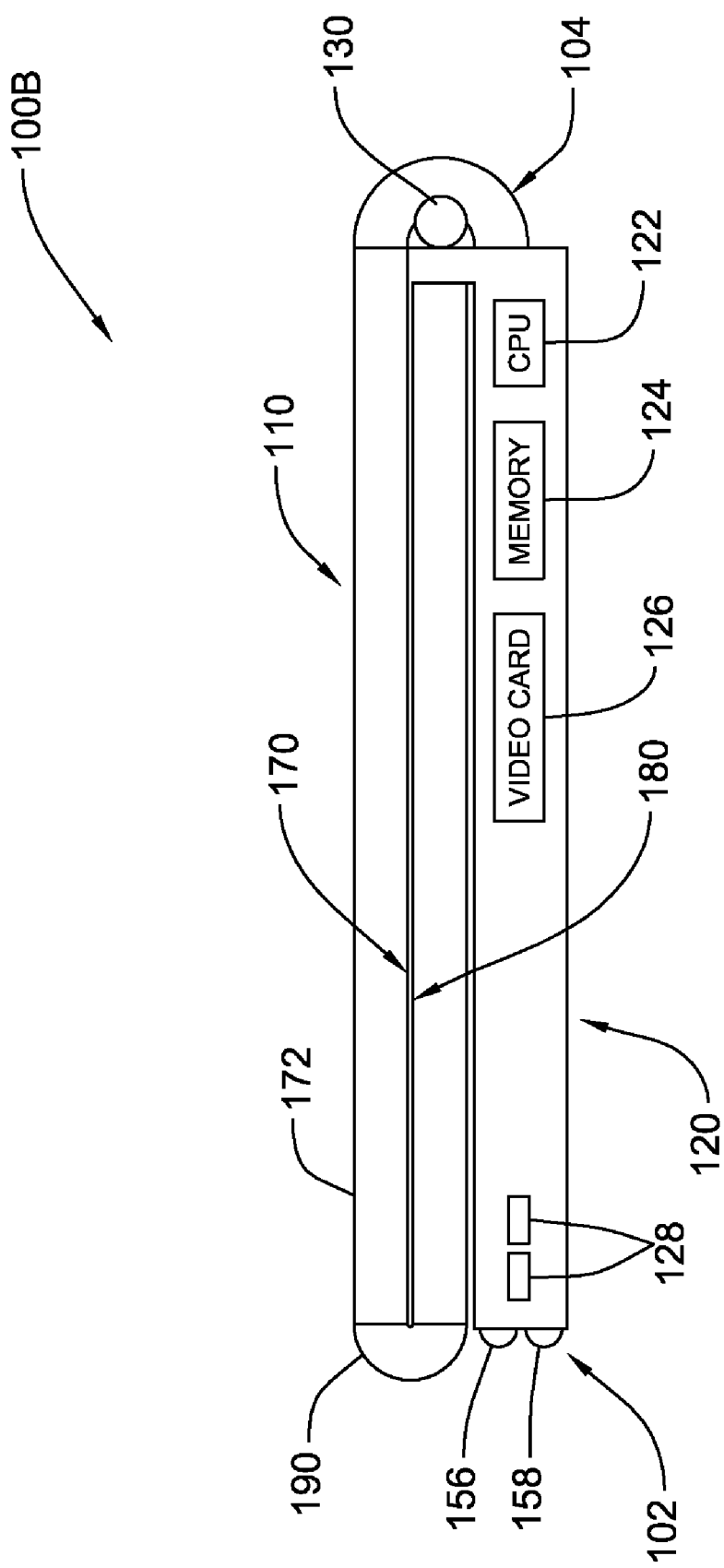
FIG. 1B depicts a side view of a fully closed compact laptop computer having a display projection system and a keyboard projection system, shown in FIG. 1A, in accordance with an embodiment of the invention.

In one embodiment, the invention provides a compact size portable personal computing device having a fully integrated display projector and a virtual keyboard projector. Reference is now made to FIGS. 1A and 1B, which depict a perspective and a side view, respectively, of a fully closed compact size portable personal computing device having a fully integrated display projector and a virtual keyboard projector, in accordance with an embodiment of the invention. The compact size portable personal computing device is referred to herein simply as "compact size laptop computer" or "compact laptop computer" or "laptop computer" or "computer system" or "computer workstation" or simply as "laptop". In particular, FIG. 1A, reference numeral 100A shows a top perspective view of a compact laptop computer having a fully integrated display projector and a virtual keyboard projector (discussed further herein below), whereas, FIG. 1B, reference numeral 100B shows a side perspective view of a compact laptop computer having a fully integrated display projector and a virtual keyboard projector (discussed further herein below). Turning to FIG. 1A, reference numeral 100A depicts a top perspective view diagram of a fully closed compact size portable personal computing device having a fully integrated display projector and a virtual keyboard projector, which is in a closed state or condition for porting or transporting the compact laptop computer. Referring to FIGS. 1A and 1B, the portable compact laptop computer comprises of a housing that includes a top lid portion 110 (or referred to as "lid" or "lid portion" or "screen") and a bottom base portion 120 (or referred to as "base" or "base unit" or "bottom"). As shown in FIG. 1A, the compact laptop computer is shown to be in a closed state, where a top surface 172 of the top lid portion or lid 110 is shown from a top view or birds eye perspective of the compact laptop computer. Further, as shown in FIG. 1B, the top lid portion 110 is proximate to and abuts against a top surface of the bottom base portion or base 120. Further, as shown in FIG. 1B, the lid portion 110 includes a foldout or foldable display that is comprised of two display panels 170 and 180, which are shown folded towards each other in the fully closed position (via a hinge mechanism 190), such that, only a top outer surface 172 of the lid portion 110 is visible in the closed position. In an embodiment, the top lid portion 110 is rotatably or pivotally mounted (reference numeral 130) to a back (reference numeral 104) of the base portion or unit 120, and where the back of the base portion is opposite to and distal to a front (reference numeral 102), also referred to herein as a "user front" of the base, that is, where the user front is proximate to a user using the compact portable computing device.

In an embodiment, the base 120 houses one or more electronic components of the compact laptop computer, such as, a central processing unit (CPU) 122 for executing instructions, a memory component 124 for storing data and programs, a video card 126 for receiving one or more video signals and an input/output bay 128 for plugging in external or peripheral input/output devices, such as, a mouse or a DVD drive, an external hard drive, etc. The base unit or portion 120 includes a sensor module 156 and an illumination module 158, which will be discussed further herein below. It will be understood by one skilled in the art that other electronic components may be included in the base unit or portion 120 of the laptop computer. Further, a component is labeled with the same reference numeral throughout the drawings for facilitating description of the invention.

Figure 2A:
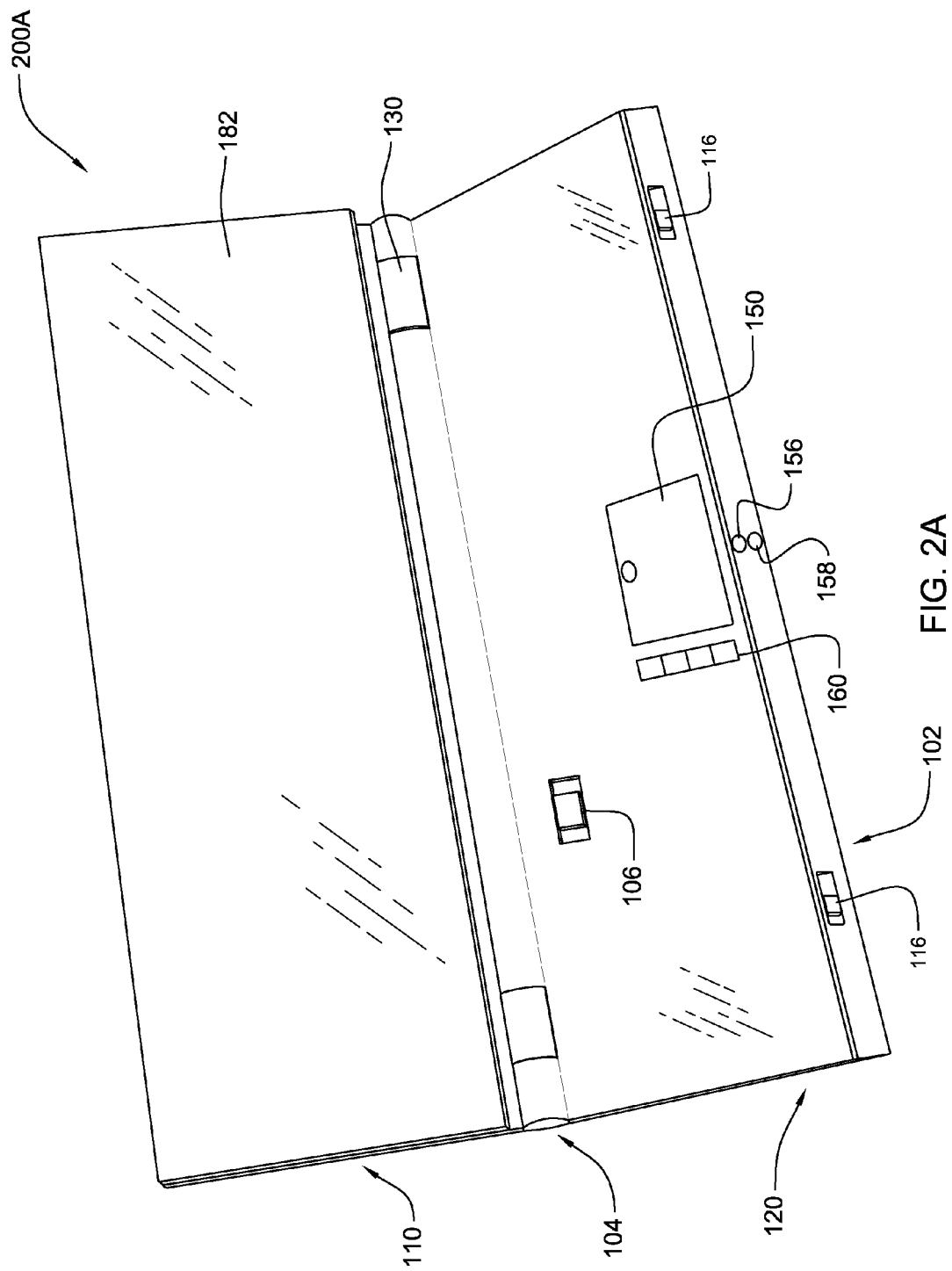
FIG. 2A depicts a perspective view of a partially opened compact laptop computer having a display projection system and a keyboard projection system, in accordance with an embodiment of the invention.
Figure 2B:
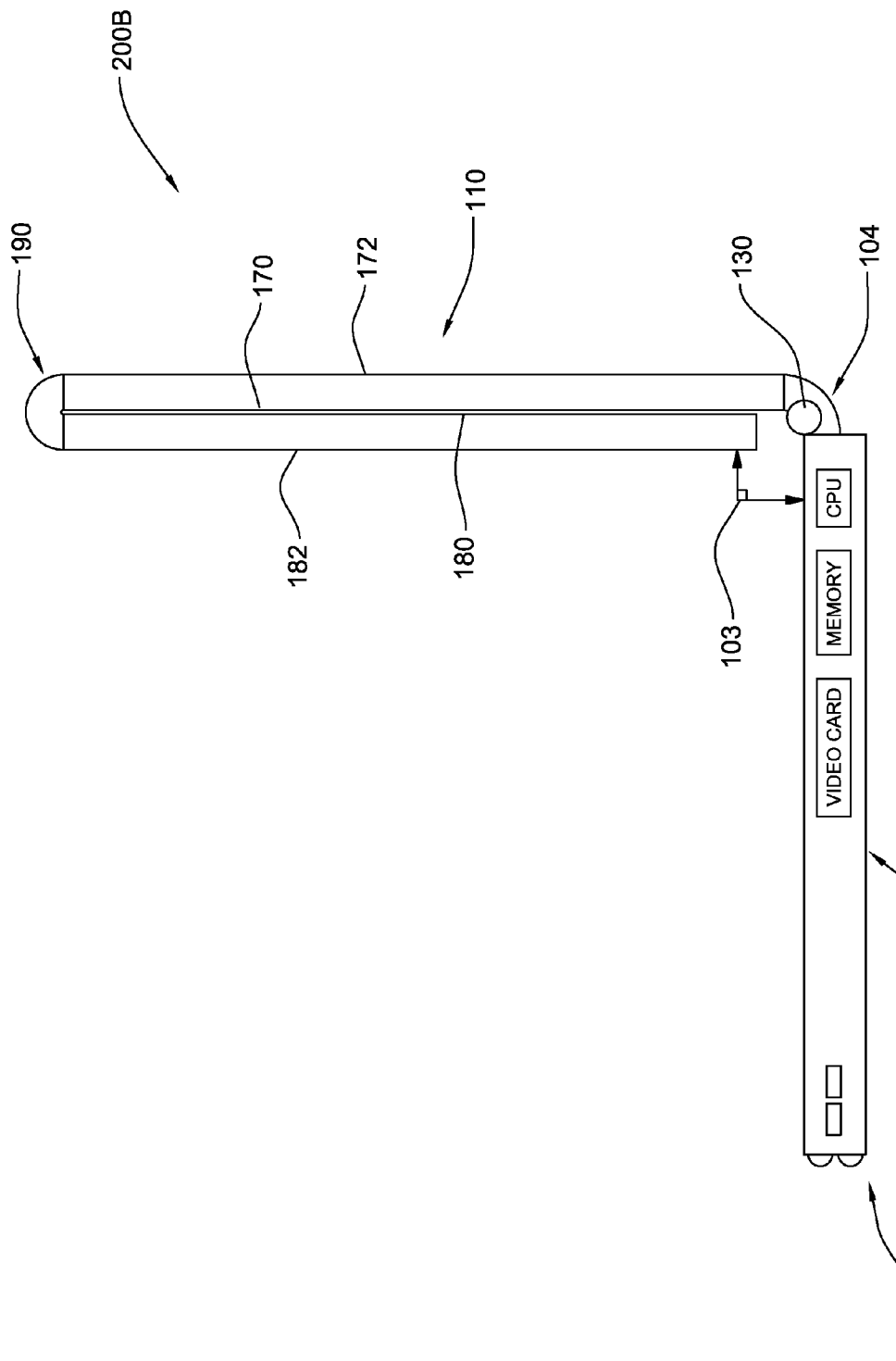
FIG. 2B depicts a side view of a partially opened compact laptop computer having a display projection system and a keyboard projection system, shown in FIG. 2A, in accordance with an embodiment of the invention.

Reference is now made to FIGS. 2A and 2B, which depict a perspective and a side view, respectively, of a partially opened compact size portable personal computing device having a fully integrated display projector and a virtual keyboard projector, in accordance with an embodiment of the invention. For instance, a user of the compact laptop computer would unlatch the latching mechanism 116 to flip open the lid portion 110 of the compact laptop computer. As shown in FIG. 1B, the base portion 120 includes a CPU (central processing unit) 122, a memory component 124 and a video card 126. Further, one or more USB ports 128 may be provided for connecting external devices, such as, a mouse, or an external DVD drive or an external hard drive, etc. It will be apparent to one skilled in the art that other components may be included in the compact laptop computer. Turning to FIG. 2A, reference numeral 200A, depicts a front perspective view diagram of the compact size portable personal computing device having a fully integrated display projector and a virtual keyboard projector, where the top lid portion or lid 110 is flipped partially open, given that the foldout or foldable display contained within the lid portion 110 is only partially opened, as discussed further herein below. In particular, as shown in FIG. 2A, an exterior portion (reference numeral 182) of the foldout or foldable display contained within the lid portion 110 is shown. Further, FIG. 2B, reference numeral 200B, depicts a side perspective view diagram of a compact laptop computer that is partially opened. As shown in FIGS. 2A and 2B, the lid portion 110 of the compact laptop computer is flipped upwards and approximately perpendicular (reference numeral 103) to the base portion 120. In an embodiment, the top lid portion 110 is rotatably or pivotally mounted (reference numeral 130) to a back (reference numeral 104) of the base portion 120, opposite from a front (reference numeral 102) of the compact laptop computer. As shown in FIGS. 2A and 2B, the top lid portion 110 of the compact size laptop is opened at an angle of approximately 90 degrees (reference numeral 103 in FIG. 2B) from the base portion 120 of the compact size laptop. In an embodiment, as shown in FIGS. 2A and 2B, the lid portion 110 includes a foldable or foldout display that includes two display panels 170 and 180 that are folded towards each other in this partially opened position, such that, only an outer surface 182 of the display panel 180 is visible when a user partially opens up the lid 110, whereas, the top outer surface 172 (shown in FIG. 1A) is distal to the user. The unfolding of the foldable lid portion is further described herein below with respect to FIGS. 3A and 3B and the remaining drawings. Further, in an embodiment, the lid portion 110 is configured to open at an angle of approximately 180 degrees from the bottom or base portion 120, as described further herein below with respect to FIG. 6. The bottom or base portion 120, in an embodiment, comprises an on/off switch 106 configured to turn the compact laptop computer on and off. The base portion 120 further includes a projection head assembly 150, which includes a display projection system or display projector and a virtual keyboard projection system or virtual keyboard projector, as discussed further herein below with respect to FIGS. 5A through 5D. In an embodiment, the base portion 120 includes a button or slide-switch 160 that is utilized by a user to activate or release the spring-loaded projection head assembly 150, discussed further herein below with respect to FIGS. 5A through 5D.

Figure 3A:
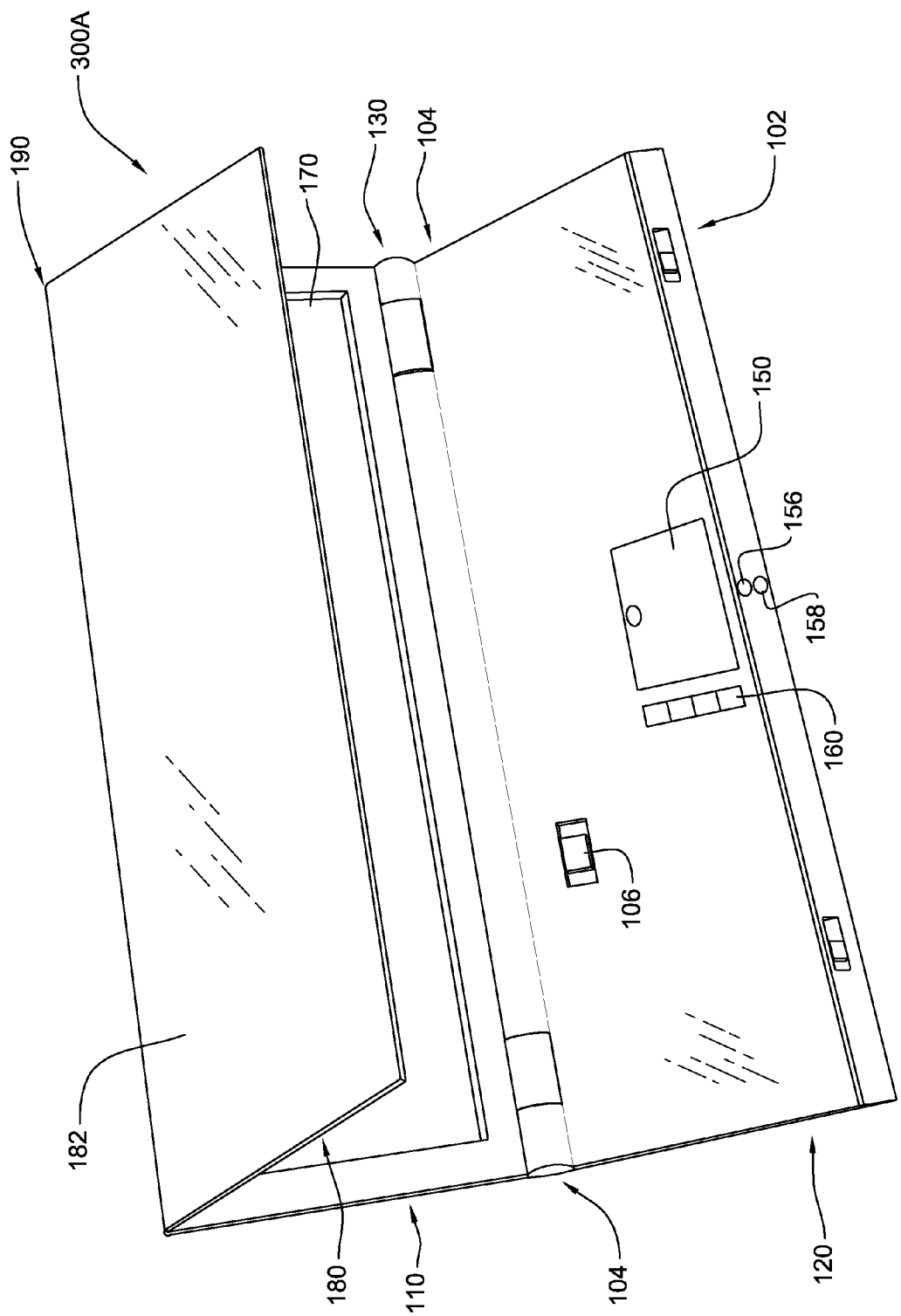
FIG. 3A depicts a perspective view of another partially opened compact laptop computer having a display projection system and a keyboard projection system, in accordance with an embodiment of the invention.
Figure 3B:
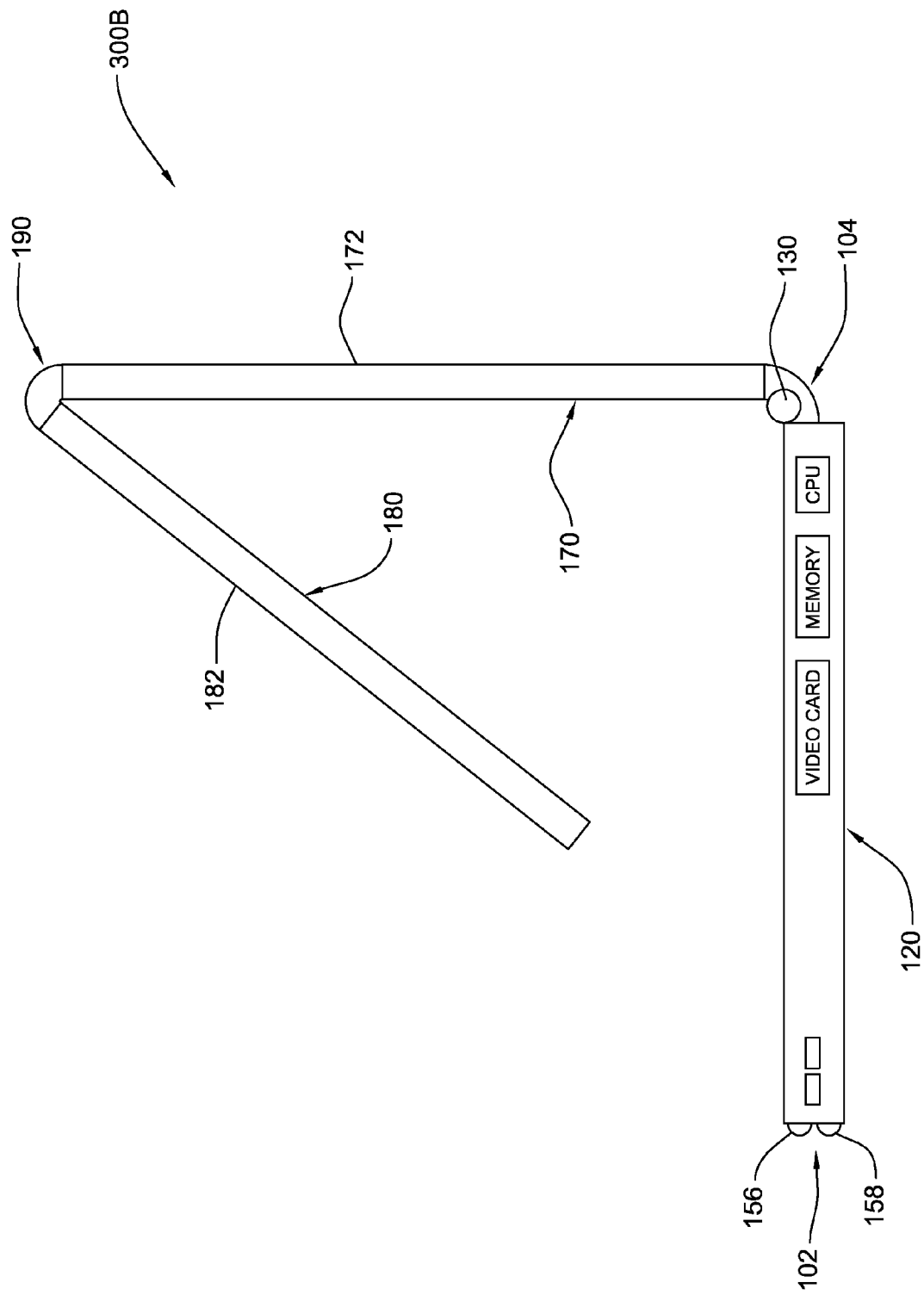
FIG. 3B depicts a side view of another partially opened compact laptop computer having a display projection system and a keyboard projection system, shown in FIG. 3A, in accordance with an embodiment of the invention.

Reference is now made to FIGS. 3A and 3B, which depict a perspective and a side view, respectively, of a partially opened compact size portable personal computing device having a fully integrated display projector and a virtual keyboard projector, in accordance with an embodiment of the invention. In particular, FIG. 3A, reference numeral 300A, depicts a front perspective view diagram of the compact size portable personal computing device having a fully integrated display projector and a virtual keyboard projector, where the top lid portion or lid 110 is shown in yet another partially opened position with the foldout or foldable display contained within the lid portion 110 being partially opened. Further, FIG. 3B, reference numeral 300B, depicts a side perspective view diagram of the compact laptop computer shown in FIG. 3A. In particular, as shown in FIG. 3A, a respective first display panel (reference numeral 180) of the foldout or foldable display contained within the lid portion 110 is shown as being partially lifted up from a respective second display panel (reference numeral 170). In an embodiment, the two display panels are connected to each other by a hinge mechanism, reference numeral 190. In this partially unfolded position, an exterior portion (reference numeral 182) of the first display panel 180 faces the user, while the first display panel 180 is hidden from the user, as shown in FIG. 3B. Further, as shown in FIGS. 3A and 3B, the revealed display panel 170 faces the user in this position, whereas, the outer surface 172 of the lid portion 110 is now distal to the user. Again, the bottom or base portion 120, in an embodiment, comprises an on/off switch 106 configured to turn the compact laptop computer on and off. The base portion 120 further includes a pop-up or spring-loaded projection head assembly 150, which includes a display projection system or display projector and a virtual keyboard projection system or virtual keyboard projector, as discussed further herein below with respect to FIG. 5. In an embodiment, the base portion 120 includes a button or slide-switch 160 that is utilized by a user to activate or release the spring-loaded or pop-up projection head assembly 150, discussed further herein below with respect to FIG. 5.

Figure 4A:
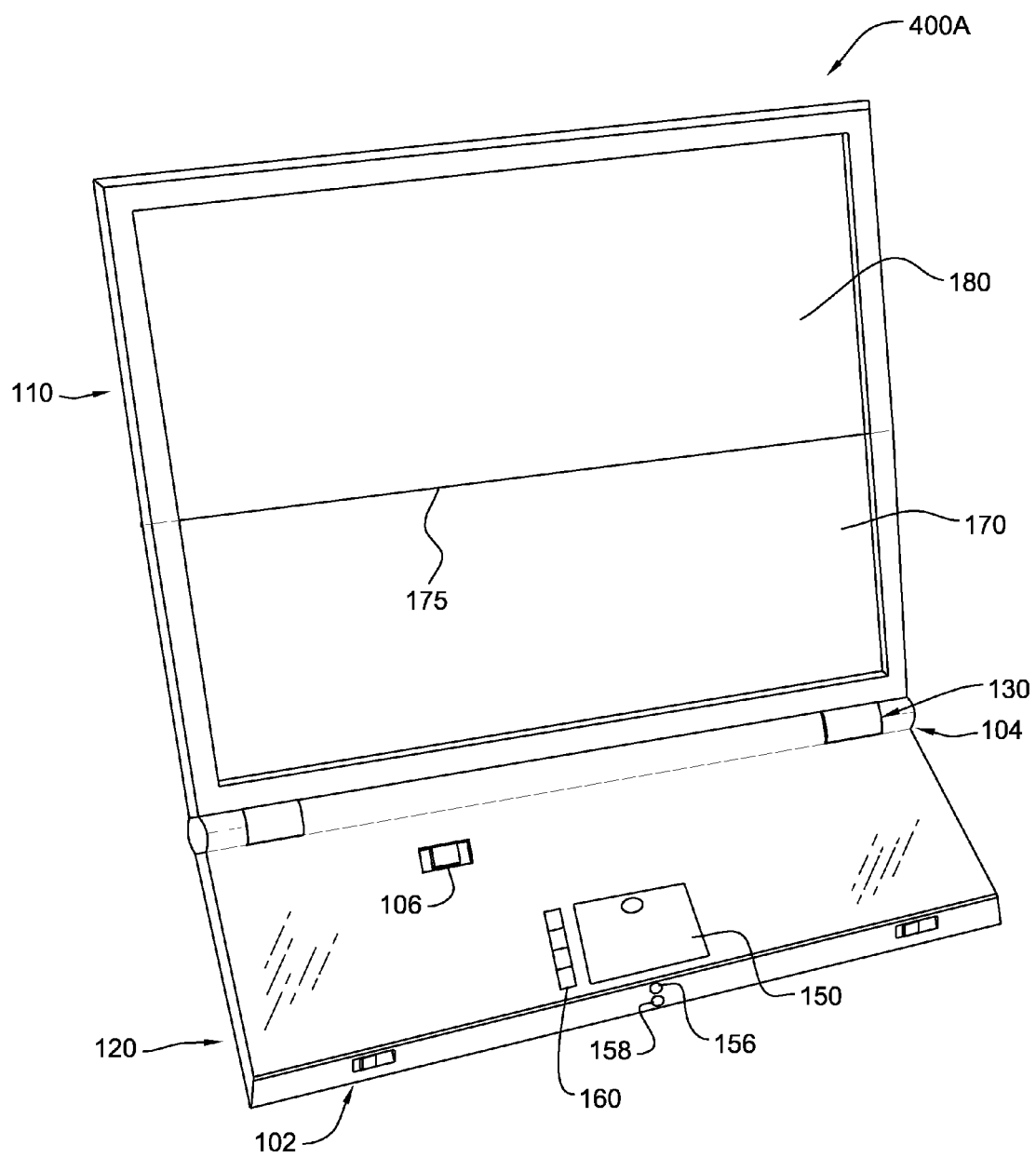
FIG. 4A depicts a perspective view of a fully opened compact laptop computer having a display projection system and a keyboard projection system, in accordance with an embodiment of the invention.
Figure 4B:
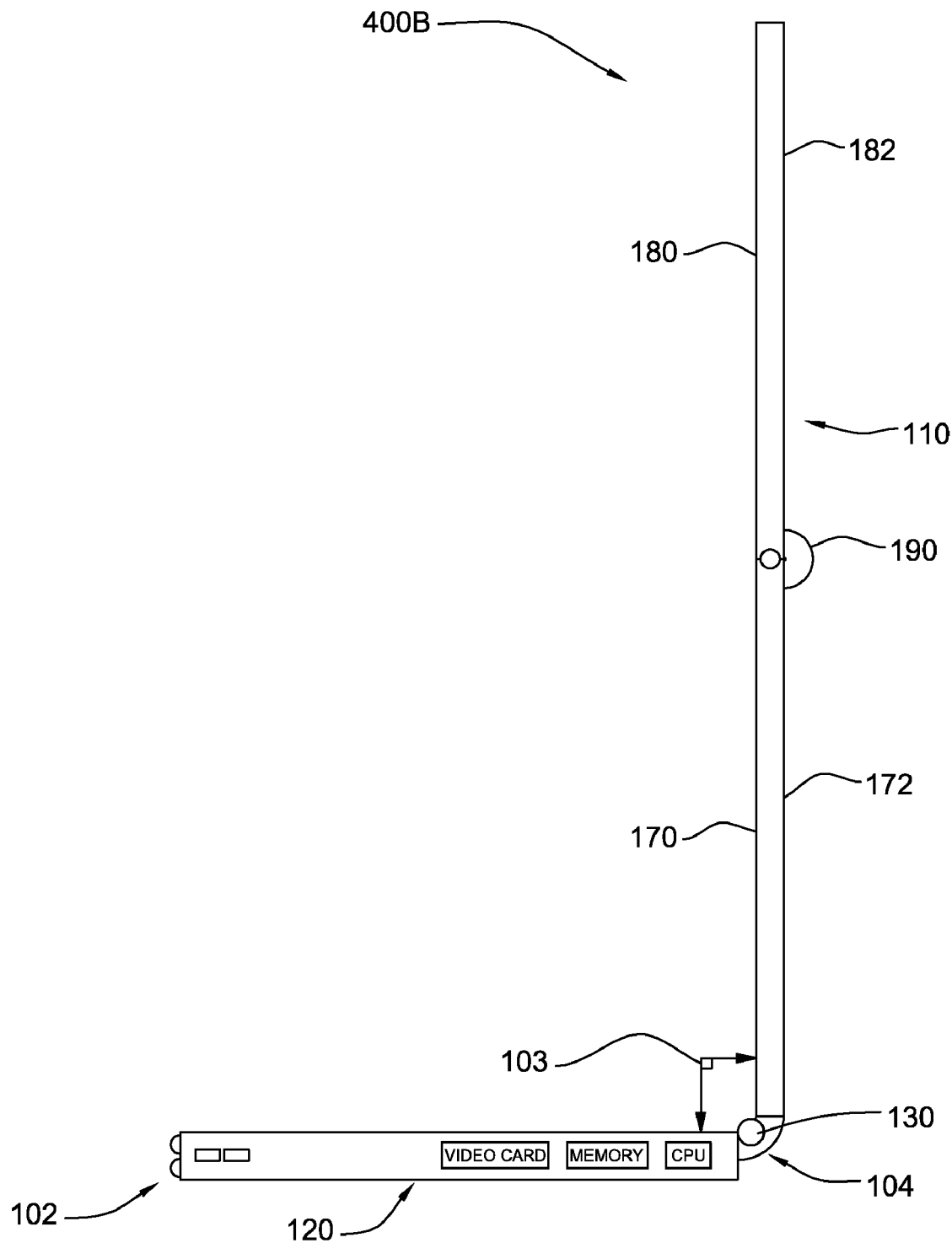
FIG. 4B depicts a side view of a fully opened compact laptop computer having a display projection system and a keyboard projection system, shown in FIG. 4A, in accordance with an embodiment of the invention.

Reference is now made to FIGS. 4A and 4B, which depict a perspective and a side view, respectively, of a fully opened compact size portable personal computing device having a fully integrated display projector and a virtual keyboard projector, in accordance with an embodiment of the invention. In particular, FIG. 4A, reference numeral 400A, depicts a front perspective view diagram of the compact size portable personal computing device having a fully integrated display projector and a virtual keyboard projector, where the foldout or foldable display contained within the lid portion 110 is shown in a fully opened position. Further, FIG. 4B, reference numeral 400B, depicts a side perspective view diagram of the compact laptop computer shown in FIG. 4A. In particular, as shown in FIGS. 4A and 4B, a respective first display panel (reference numeral 180) of the foldout or foldable display contained within the lid portion 110 is shown fully lifted up from a respective second display panel (reference numeral 170), such that, the angle of the first display panel matches that of the second display panel and, such that, the two display panels contained within the lid portion 110 now lie in a single plane, forming one display panel that is approximately 90 degrees to the base portion 120. In this fully unfolded position, the display panels (reference numerals 170 and 180) each face the user. Further, as shown in FIG. 4B, the two display panels 180 and 170 are foldably connected via a hinge mechanism 190, such that, the two display panels appear to have a unified appearance with only a faint, hairline gap (reference numeral 175) being visible when the display panels or screens are fully opened and the display is active.

Accordingly, in order to use the compact laptop computer, a user lifts up on the hinged lid portion 110 to a position a few degrees off of 90, as shown in FIGS. 2A and 2B. The user then swings the top display panel (reference numeral 180 in FIGS. 3A and 3B) closest to the user upwards and towards the user and then back up, such that, the display panel matches a same angle as that of the lower display panel (reference numeral 170 to achieve a full-sized laptop display screen, as shown in FIGS. 4A and 4B. In an embodiment, the exterior surfaces (reference numerals 172 and 182, as shown in FIGS. 1A and 1B, respectively) of the two foldable or foldout laptop screen panel are constructed of an eco-conforming Cycoloy C6600 resin, a blend of polycarbonate (PC) and acrylonitrile-butadiene-styrene (ABS), which provides durability and impact resistance, such as, plastics manufactured by General Electric Company. Alternatively, the exterior surface of the display panels can be constructed of a rubberized metal, such as, those used in some laptop computers. Further, in an embodiment, the display panel surfaces are manufactured using the GooSystems CRT White Topcoat Screen Goo, which is a specially formulated, color corrected, screen coating commercially available in liquid form. Alternatively, the display panel surfaces can include standard projection screen fabric that is adhered to the two folding panels, taking into consideration the folding nature of the panels. Further, if a screen coating is used, then the display panels are machined to be of such tolerances and precision that only a faint, hairline gap (reference numeral 175) would be visible when the display screens are fully opened and the display is active, as shown in FIG. 4A. If a projection screen material is employed, then there would be no gap or space between the panels, as the fabric would simply unfold and be held taught when both panels are fully opened, as shown in FIG. 7B herein below.

Figure 5A:
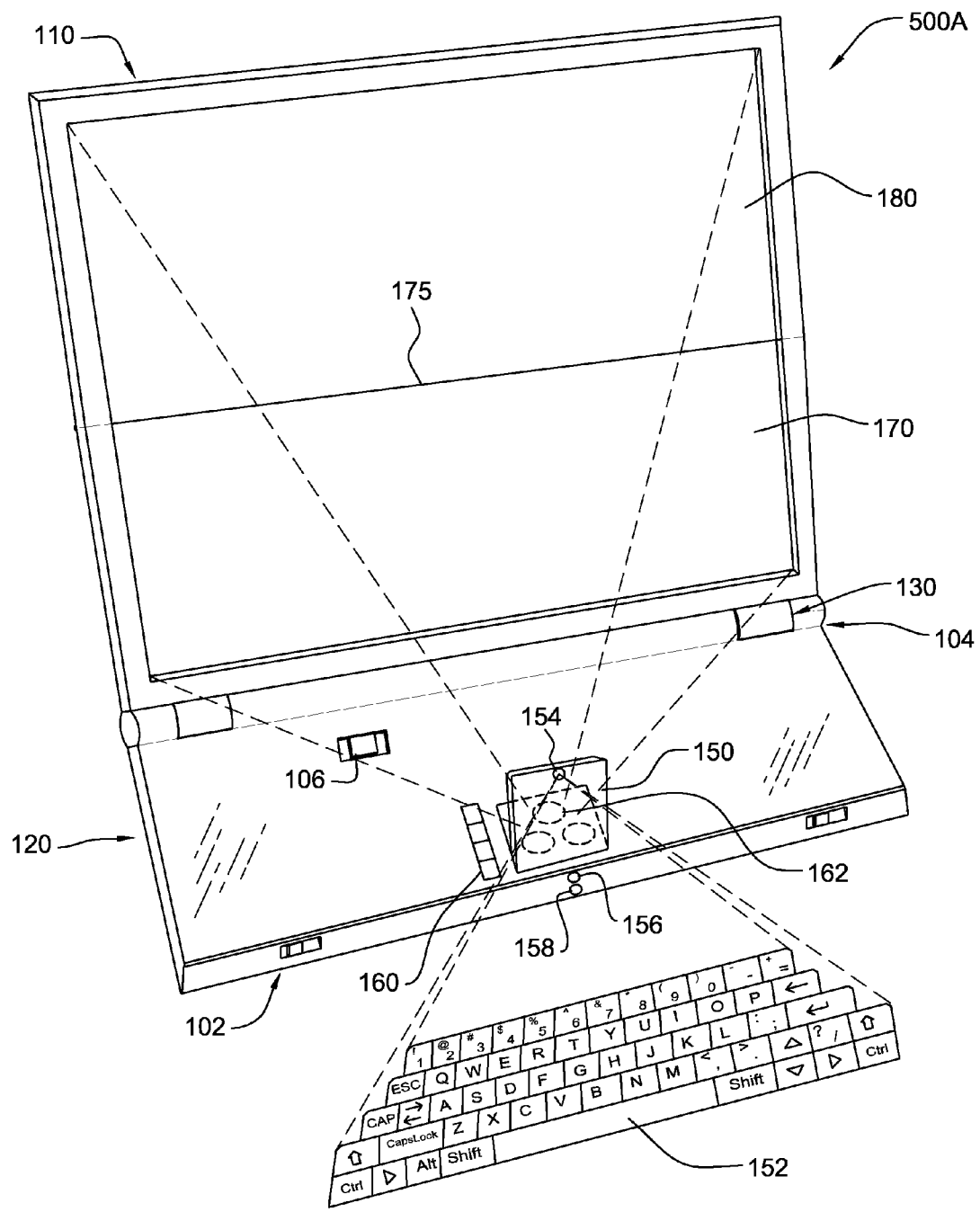
FIG. 5A depicts a perspective view of a fully opened compact laptop computer having a display projection system and a keyboard projection system, where the lid portion is retracted into the back of the base portion of the compact laptop computer, in accordance with an embodiment of the invention.
Figure 5B:
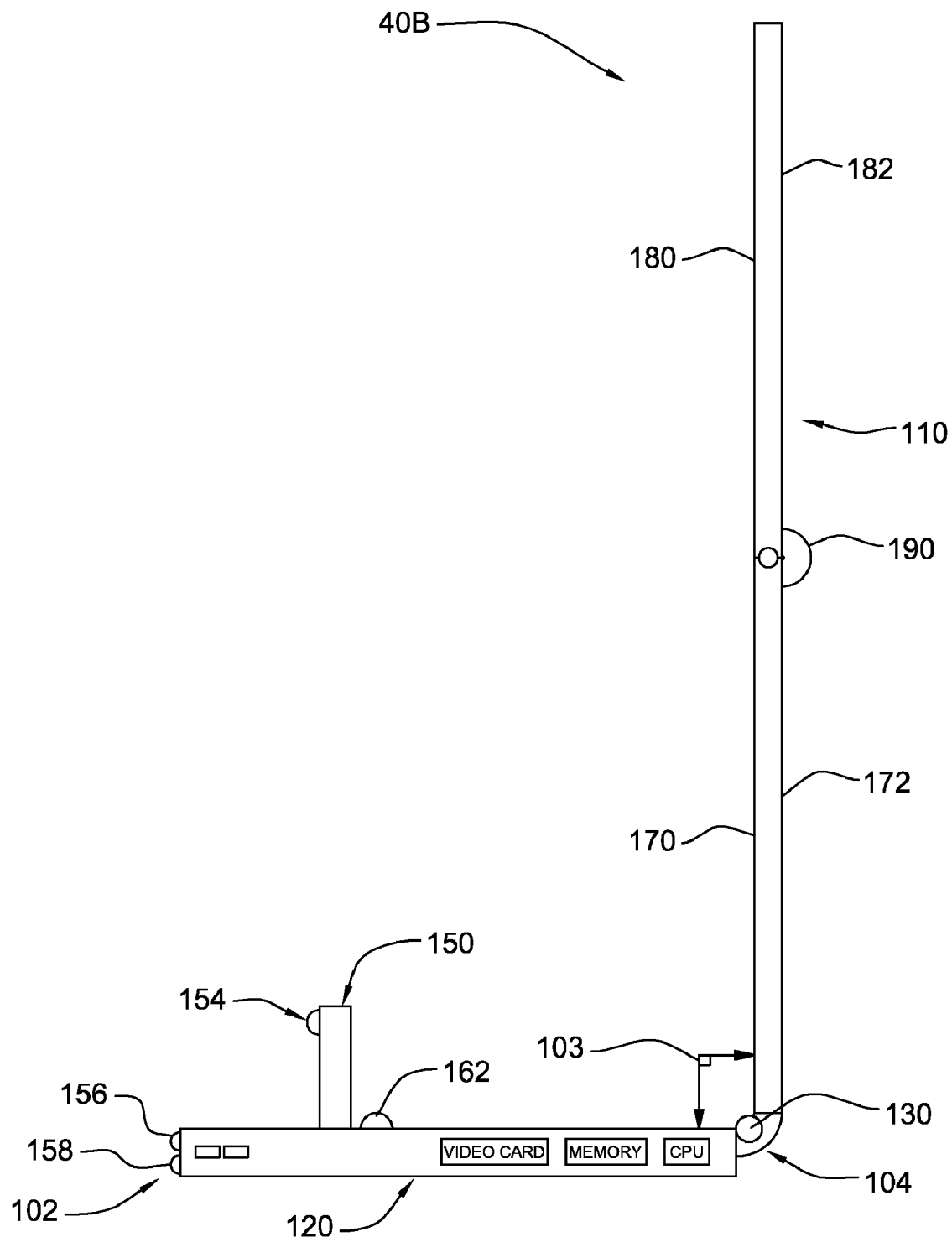
FIG. 5B depicts a side view of a fully opened compact laptop computer having a display projection system and a keyboard projection system, shown in FIG. 5A, where the lid portion is retracted into the back of the base portion of the compact laptop computer, in accordance with an embodiment of the invention.

Reference is now made to FIGS. 5A and 5B, which depict a perspective and a side view, respectively, of a fully opened compact size portable personal computing device having a fully integrated display projector and a virtual keyboard projector, in accordance with an embodiment of the invention. Turning to FIG. 5A, FIG. 5A depicts a perspective view diagram of the compact size portable personal computing device having a fully integrated display projector and a virtual keyboard projector, in accordance with an embodiment of the invention. In particular, as shown in FIG. 5A, the compact size portable personal computing device has a spring-loaded projection head assembly 150, which has been deployed or activated by a user, using the slide switch 160. As such, the projection head assembly 150 is shown in an upright position, approximately 90 degrees from the base portion 120. In an embodiment, the projection head assembly 150 is shown to include a keyboard projector or projection system 154, which in an embodiment, is configured to project (shown by dotted lines emanating from projector module 154) a keyboard image 152 to an input area in front of the compact laptop computer and proximate to a user, such that, a user can input data into the compact laptop computer. In an embodiment, as shown in FIG. 5A, the projection head assembly 150 pops up at an angle approximately 90 degrees to the base unit 120, such that, the keyboard projector module 154 can project a virtual image of a keyboard 152 in front of the user. In an embodiment, the keyboard projector module 154 includes a laser diode or diode laser and a diffractive optical element for projecting an image of the desired keyboard interface in front of a user of the compact laptop computer, as shown in FIG. 5A. Further, the sensor module 156 is mounted within the base portion 120 and towards the front (reference numeral 102) of the compact laptop computer. The sensor module 156 is configured to sense user interaction with the virtual keyboard interface surface 152 that is projected in front of a user. In an embodiment, the sensor module 156 comprises a CMOS (Complimentary Metal-Oxide Semiconductor) camera and a sensor chip. Similarly, an illumination module 158 is mounted within the base portion 120 and towards the front (reference numeral 102) of the compact laptop computer. In an embodiment, the sensor module 156 is mounted above the illumination module 158. In an embodiment, the illumination module 158 comprises a laser diode and custom optics. The illumination module 158 is configured to provide illumination to the user for inputting data into the compact laptop computer. Turning to FIG. 5B, reference numeral 500B, depicts a side perspective view diagram of the compact laptop computer shown in FIG. 5A. In particular, FIG. 5B shows a projection head assembly 150, which has been triggered or deployed by a user and, as such, is shown in an upright position, approximately 90 degrees from the base portion 120. In an embodiment, the projection head assembly 150 is shown to include a keyboard projector or projection system 154, which in an embodiment, is configured to project a keyboard image (not shown in FIG. 5B) onto an input area in front of the compact laptop computer (reference numeral 102) and proximate to a user, such that, a user can input data, using the virtual keyboard, into the compact laptop computer. In an embodiment, as shown in FIG. 5B, the projection head assembly 150 includes a keyboard projector module 154 configured to project a virtual image of a keyboard (not shown in FIG. 5B) onto a surface in front (reference numeral 102) of a user and distal to the foldout or foldable screen within the lid (reference numeral 110) of the compact laptop computer. The keyboard projector module 154 includes a laser diode or diode laser and a diffractive optical element for projecting an image of a desired keyboard interface in front of a user of the compact laptop computer. Further, the sensor module 156, which is configured to sense user interaction with the virtual keyboard interface surface, is mounted within the base portion 120 and towards the front (reference numeral 102) of the compact laptop computer. Similarly, an illumination module 158 is mounted within the base portion 120 and towards the front (reference numeral 102) of the compact laptop computer. In an embodiment, the illumination module 158, which is configured to provide illumination to the user for inputting data into the compact laptop computer, is mounted below the sensor module 156. Accordingly, the virtual keyboard input device is configured to optically interface with a user in order to detect the position of objects within a particular input zone, i.e., an area in which the user may interact to enter character data into the compact laptop computer. Each character data corresponds to a unique arrangement and position of the objects within the input zone, for instance, a user's fingers on a virtual keyboard. The virtual keyboard device includes a sensor module 156 that includes a source of optical sensor light illuminating the input zone with sensor light, which reflects off the user's fingers. The virtual keyboard projection system 154 also includes an optical detector configured to receive the reflected sensor light as a reflected light pattern representing the position of the operator's fingers within the input zone. The optical detector converts the reflected light pattern to an electrical signal representing the particular character data. A microprocessor or processing unit within the compact laptop computer then receives the electrical signal and correlates the electrical signal to character data. Further, as shown in FIGS. 5A and 5B, the display projection module 162 of the compact laptop computer is mounted within the base portion 120 in front of the projection head assembly 150, proximate to the foldable or foldout display 170 and 180 in the lid portion 110 of the compact laptop computer. In an embodiment, the display projection module 162 is a spring-loaded tri-color (RGB or Red, Green and Blue) LED (Light Emitting Diode) emitters or a tri-color laser diode device that is configured to point at a proper angle for projecting an image (not shown in FIG. 5A) onto the foldout display of the compact laptop computer. In an embodiment, the spring-loaded LED emitter device is user configurable through the use of a Vernier-type thumb wheels and other calibration controls to ensure proper picture alignment. Although, the tri-color LEDs of the display projection module 162 are shown as protruding out of the base 120, it is understood by one skilled in the art that the LEDs may be mounted to be flush or embedded within the base unit 120, but pointing at an angle up at the screen or display.

Figure 5C:
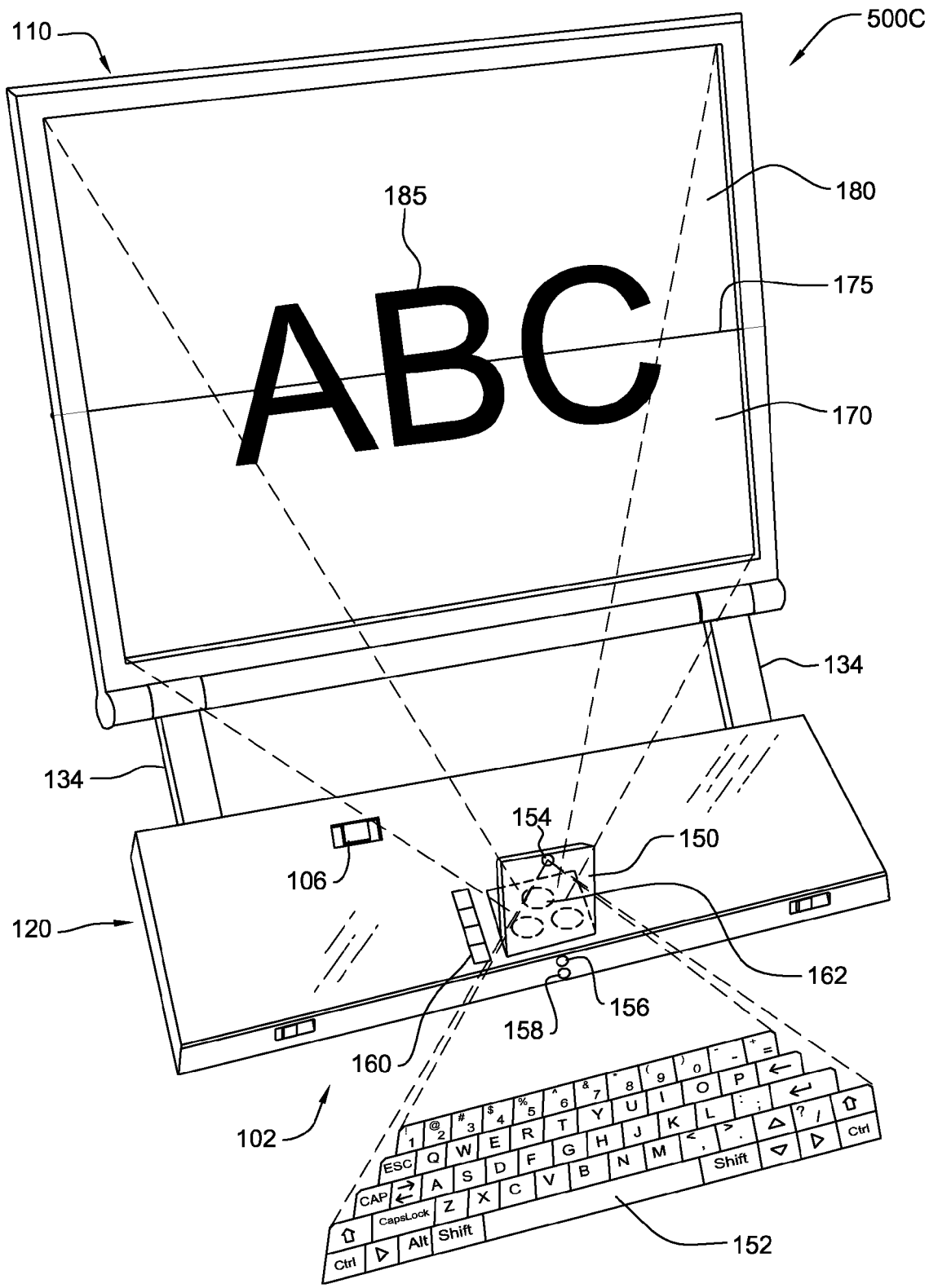
FIG. 5C depicts a perspective view of a fully opened compact laptop computer having a display projection system and a keyboard projection system, where the lid portion is extended away from the back of the base portion of the compact laptop computer, in accordance with an embodiment of the invention.
Figure 5D:
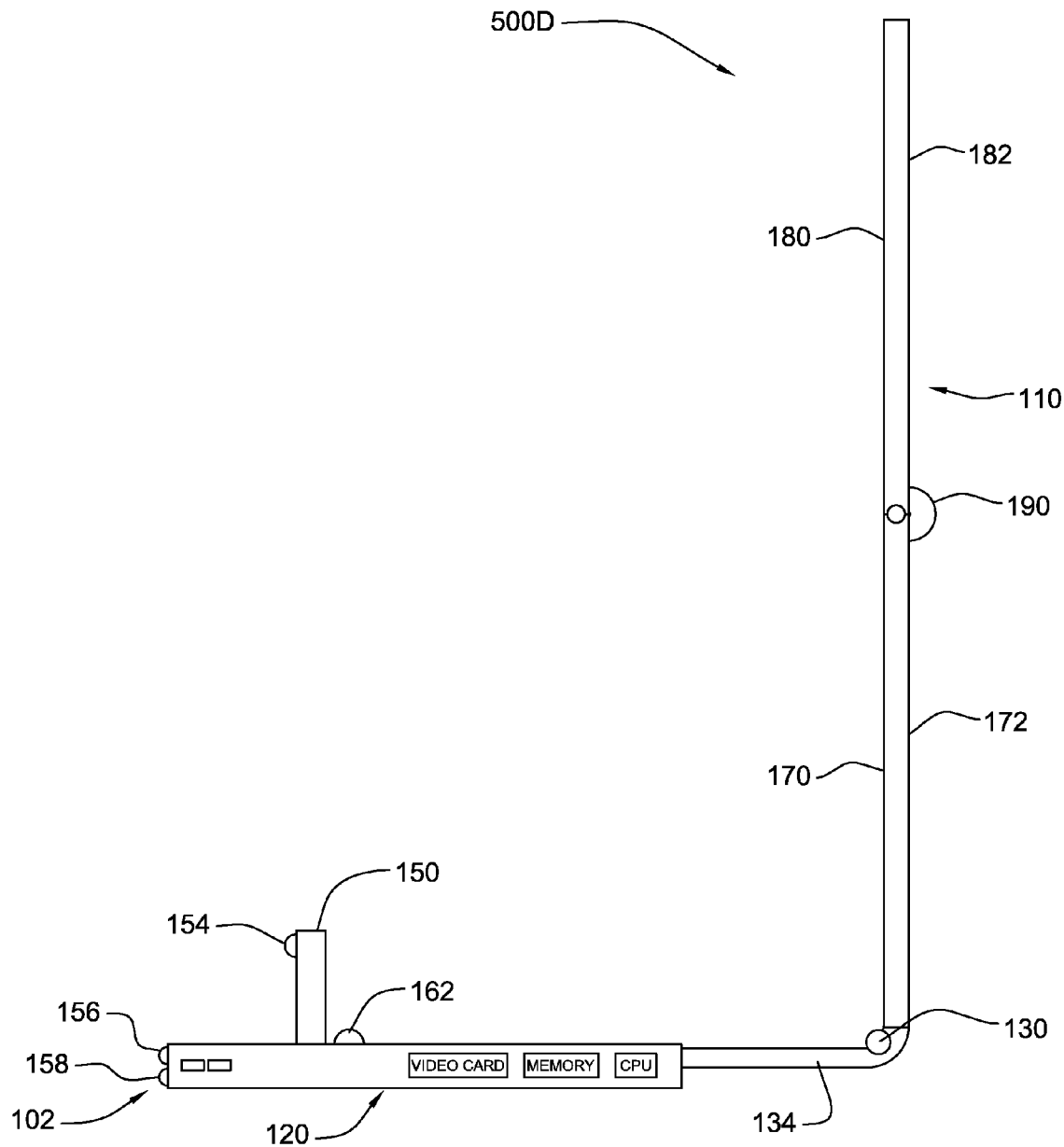
FIG. 5D depicts a side view of a fully opened compact laptop computer having a display projection system and a keyboard projection system, where the lid portion is extended away from the back of the base portion of the compact laptop computer, in accordance with an embodiment of the invention.

Reference is now made to FIGS. 5C and 5D, which depict a perspective and a side view, respectively, of a fully opened compact size portable personal computing device having a fully integrated display projector and a virtual keyboard projector, where the in accordance with an embodiment of the invention. Turning to FIG. 5C, FIG. 5C depicts a perspective view diagram of the compact size portable personal computing device having a fully integrated display projector and a virtual keyboard projector, in accordance with an embodiment of the invention. In particular, as shown in FIG. 5C, the compact size portable personal computing device has a projection head assembly 150, which has been deployed or activated by a user, using the slide switch 160. As such, the projection head assembly 150 is shown in an upright position, approximately 90 degrees from the base portion 120. In an embodiment, the projection head assembly 150 is shown to include a keyboard projector or projection system 154, which in an embodiment, is configured to project a keyboard image 152 to an input area in front of said compact laptop computer and proximate to a user, such that, a user can input data into the compact laptop computer. In an embodiment, as shown in FIG. 5C, the projection head assembly 150 includes a keyboard projector module 154 configured to project a virtual image of a keyboard 152. The keyboard projector module 154 includes a laser diode or diode laser and a diffractive optical element for projecting an image of the desired keyboard interface in front of a user of the compact laptop computer, as shown in FIG. 5C. Further, the sensor module 156 is mounted within the base portion 120 and towards the front (reference numeral 102) of the compact laptop computer. The sensor module 156 is configured to sense user interaction with the virtual keyboard interface surface 152 that is projected in front of a user. In an embodiment, the sensor module 156 comprises a CMOS (Complimentary Metal-Oxide Semiconductor) camera and a sensor chip. Similarly, an illumination module 158 is mounted within the base portion 120 and towards the front (reference numeral 102) of the compact laptop computer. In an embodiment, the sensor module 156 is mounted above the illumination module 158. In an embodiment, the illumination module 158 comprises a laser diode and custom optics. The illumination module 158 is configured to provide illumination to the user for inputting data into the compact laptop computer. Further, as shown in FIG. 5C, the compact laptop computer includes a sliding mechanism 134 for sliding the lid portion 110 away from the base portion 120 to an extended fixed position, such that, a greater distance is provided for the display projector 162 to properly focus and display an image onto the display screens 170 and 180. In particular, as shown in FIG. 5C, the base portion 120 includes two bar members that are configured to slide in and out of the base portion 120, such that, the display screen has two fixed positions. The first fixed position being a retracted fixed position, where the bar members 134 are fully retracted into the base portion 120 (as shown in FIG. 5A) and a second fixed position or mode, where the bar members 134 are extended away from the base portion 120 of the compact laptop computer (as shown in FIG. 5C), thus, providing a greater distance for the display projector 162 to properly focus and display an image onto the screens 170 and 180. Turning to FIG. 5D, reference numeral 500B, depicts a side perspective view diagram of the compact laptop computer shown in FIG. 5C. In particular, FIG. 5D shows a projection head assembly 150, which has been triggered or deployed by a user and, as such, is shown in an upright position, approximately 90 degrees from the base portion 120. In an embodiment, the projection head assembly 150 is shown to include a keyboard projector or projection system 154, which in an embodiment, is configured to project a keyboard image (not shown in FIG. 5D) onto an input area in front of the compact laptop computer (reference numeral 102) and proximate to a user, such that, a user can input data, using the virtual keyboard, into the compact laptop computer. In an embodiment, as shown in FIG. 5D, the projection head assembly 150 includes a keyboard projector module 154 configured to project a virtual image of a keyboard (not shown in FIG. 5D) onto a surface in front (reference numeral 102) of a user and distal to the foldout or foldable screen within the lid (reference numeral 110) of the compact laptop computer. The keyboard projector module 154 includes a laser diode or diode laser and a diffractive optical element for projecting an image of the desired keyboard interface in front of a user of the compact laptop computer. Further, the sensor module 156, which is configured to sense user interaction with the virtual keyboard interface surface, is mounted within the base portion 120 and towards the front (reference numeral 102) of the compact laptop computer. Similarly, an illumination module 158 is mounted within the base portion 120 and towards the front (reference numeral 102) of the compact laptop computer. In an embodiment, the illumination module 158, which is configured to provide illumination to the user for inputting data into the compact laptop computer, is mounted below the sensor module 156. Accordingly, the virtual keyboard input device is configured to optically interface with a user in order to detect the position of objects within a particular input zone, i.e., an area in which the user may interact to enter character data into the compact laptop computer. Each character data corresponds to a unique arrangement and position of the objects within the input zone, for instance, a user's fingers on a virtual keyboard. The virtual keyboard device includes a sensor module 156 that includes a source of optical sensor light illuminating the input zone with sensor light, which reflects off the user's fingers. The virtual keyboard projection system 154 also includes an optical detector configured to receive the reflected sensor light as a reflected light pattern representing the position of the operator's fingers within the input zone. The optical detector converts the reflected light pattern to an electrical signal representing the particular character data, for instance, the characters ABC (reference numeral 185) inputted by a user into the virtual keyboard image 152. A microprocessor or processing unit within the compact laptop computer then receives the electrical signal and correlates the electrical signal to character data. Further, as shown in FIGS. 5C and 5D, the display projection module 162 of the compact laptop computer is mounted within the base portion 120 in front of the projection head assembly 150, proximate to the foldable or foldout display 170 and 180 in the lid portion 110 of the compact laptop computer. In an embodiment, the display projection module 162 is a spring-loaded tri-color (RGB or Red, Green and Blue) LED (Light Emitting Diode) emitters or a tri-color laser diode device that is configured to point at a proper angle for projecting an image 185 onto the foldout display of the compact laptop computer. The dotted lines shown simply refer to the projection of the image 185 from the screen projector 162 to the screen. In an embodiment, the spring-loaded tri-color LED emitter device is user configurable through the use of a Vernier-type thumb wheels and other calibration controls to ensure proper picture alignment. Although, the tri-color LEDs of the display projection module 162 are shown as protruding out of the base 120, it is understood by one skilled in the art that the LEDs may be mounted to be flush or embedded within the base unit 120, but pointing at an angle up at the screen or display. Further, as shown in FIG. 5D, the display screen is at an extended fixed position or mode, where the bar members 134 are extended away from the base portion 120 of the compact laptop computer (as opposed to the retracted position shown in FIG. 5C), thus, providing a greater distance for the display projector 162 to properly focus and display an image 185 onto the screens 170 and 180. It will be understood by one skilled in the art that the sliding mechanism 134 can be designed in other ways, for instance, the bars 134 could be bent at a 90 degree angle or could be L-shaped for carrying out the purpose of retracting and extending the lid portion 110 from the base portion 120.

Figure 6:
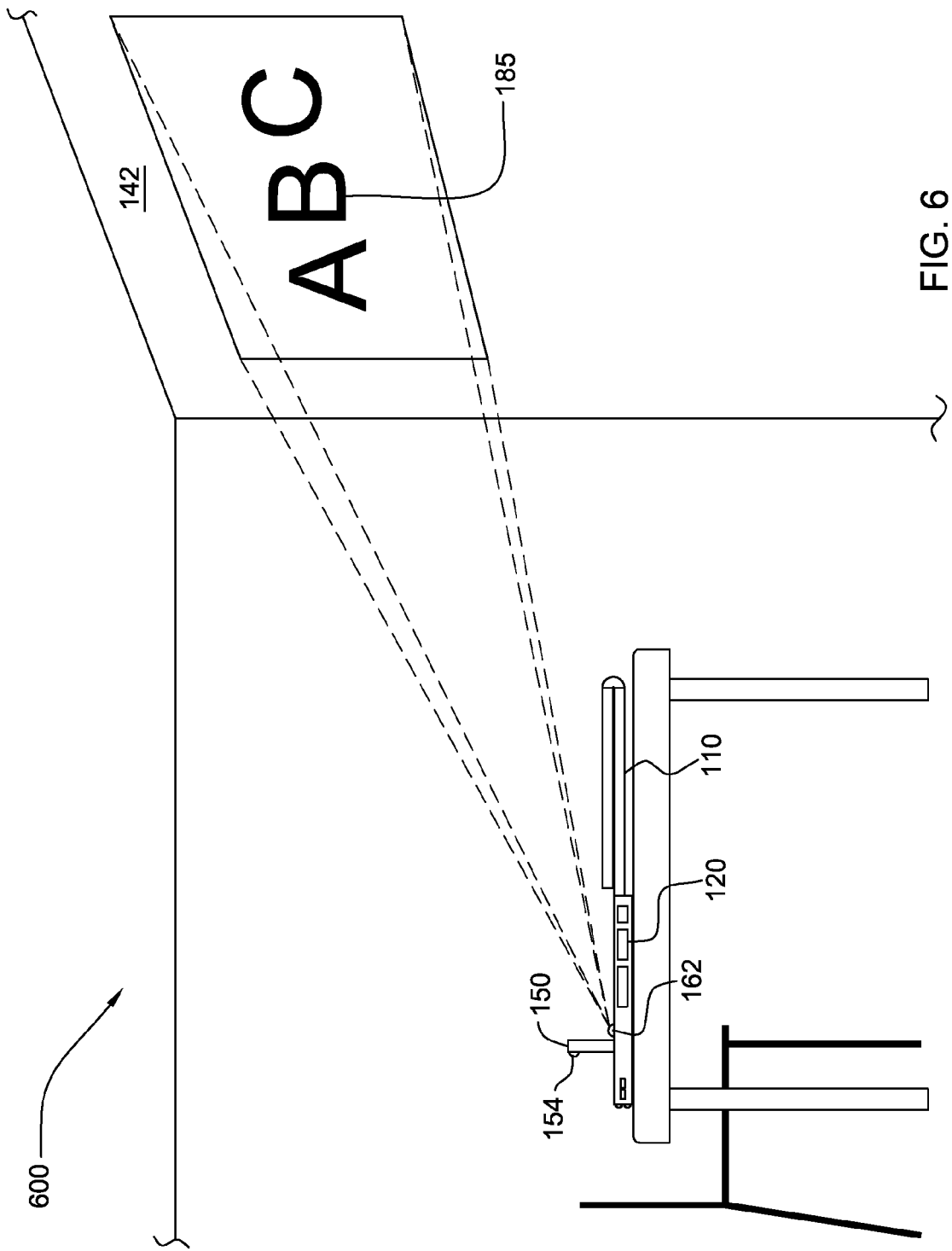
FIG. 6 depicts a side view of a partially opened compact laptop computer having a display projection system and a keyboard projection system, for displaying an image from the display projection system to a surface external to the compact laptop computer, in accordance with an embodiment of the invention.

Reference is now made to FIG. 6, which depicts a side view embodiment of a partially opened compact size portable personal computing device having a fully integrated display projector and a virtual keyboard projector, in accordance with an embodiment of the invention. In particular, as shown in FIG. 6, the compact size portable personal computing device is shown with the lid portion 110 opened to approximately 180 degrees from the base unit 120 for use as a projector for projecting an image 185 onto a surface 142. The surface 142 can be a wall (as shown) or can be a projection screen that is pulled down from the wall surface 142. The compact laptop computer includes a projection head assembly 150, which has been deployed or activated by a user, using the slide switch 160 (discussed herein above). As such, the projection head assembly 150 is shown in an upright position, approximately 90 degrees from the base portion 120. Further, as shown in FIG. 6, the display projection module 162 is mounted within the base portion 120 and in front of the projection head assembly 150 (having the keyboard projector 154 mounted thereon), and proximate to the foldable or foldout display of the lid portion 110 of the compact laptop computer. In an embodiment, the display projection module 162 is a spring-loaded tri-color (RGB or Red, Green and Blue) LED (Light Emitting Diode) emitters or a tri-color laser diode device that is configured to point at a proper angle for projecting (referred to by dotted lines) an image 185 onto the wall or a projection screen 142. In an embodiment, the spring-loaded LED emitter device is user configurable through the use of a Vernier-type thumb wheels and other calibration controls to ensure proper picture alignment. Focusing of the projector may use an autofocus technology, where the projector displays a known image on the screen and, further, scans the resulting output to determine if any changes need to be made to the image. For instance, a black square on a white background can be displayed on the background and viewed by the sensors proximate to the projector to determine the size and shape of the image. Accordingly, when the foldable display screens of the compact laptop computer are in an upward position, the screen size would be a known size, namely, the size of the total or combined display screens (as shown in FIG. 5A, for instance), and when the foldable display screens are in a downward position approximately 180 degrees from the base unit 120, that is, in a projector mode (as shown in FIG. 6), then the size could be fixed at a larger size, for instance a projection screen or a wall surface.

Figure 7A:
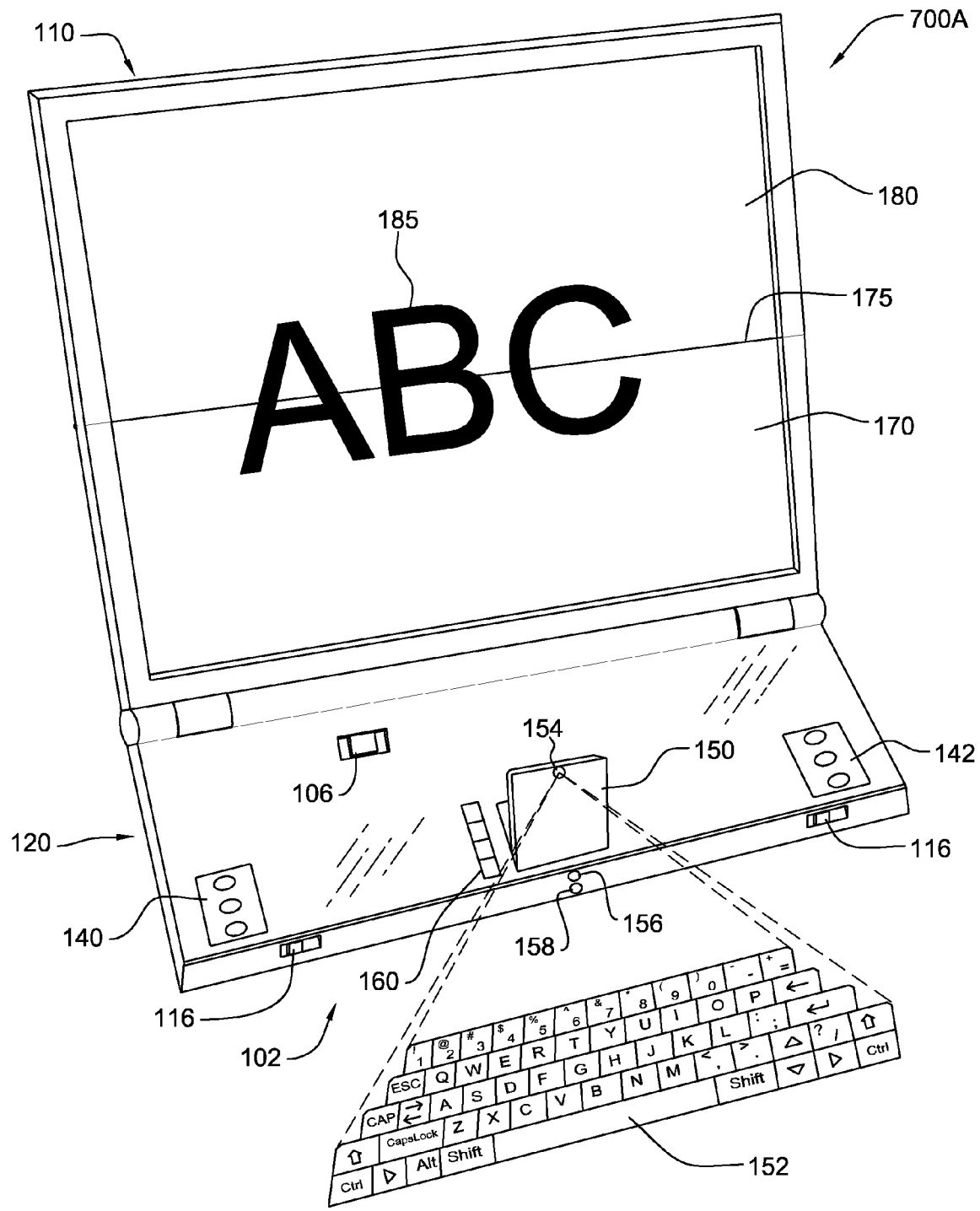
FIG. 7A depicts a perspective view of another embodiment of a fully opened compact laptop computer having dual display projection systems and a keyboard projection system, where the lid portion is retracted into the back of the base portion of the compact laptop computer, in accordance with an embodiment of the invention.
Figure 7B:
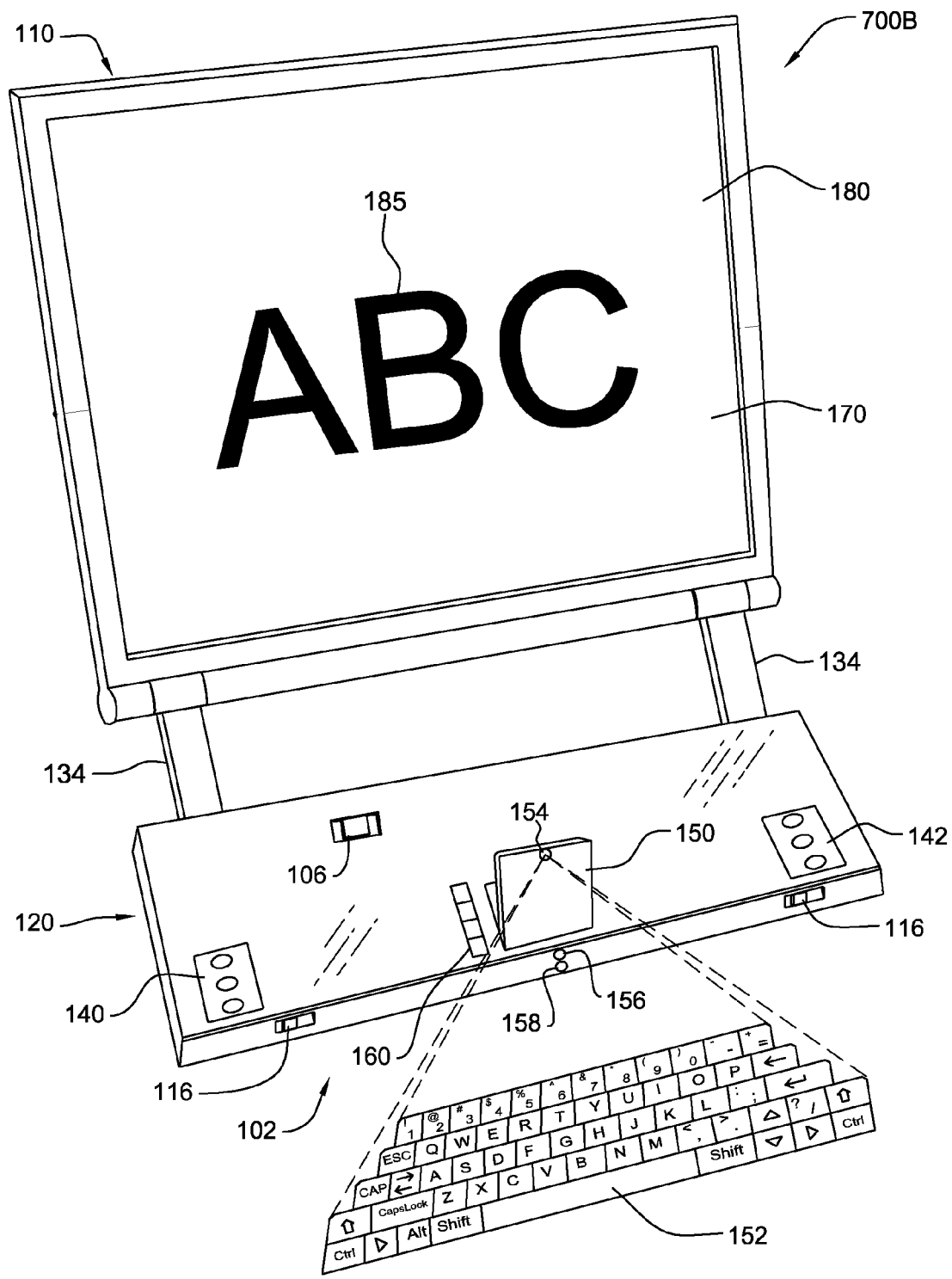
FIG. 7B depicts a perspective view of another embodiment of a fully opened compact laptop computer having dual display projection systems and a keyboard projection system, where the lid portion is extended away from the back of the base portion of the compact laptop computer, in accordance with an embodiment of the invention.

Reference is now made to FIGS. 7A and 7B, which depict a perspective and a side view, respectively, of a fully opened compact size portable personal computing device having a fully integrated display projector and a virtual keyboard projector, in accordance with respective embodiments of the invention. Reference is now made to FIG. 7A, which depicts another embodiment of a fully opened compact size portable personal computing device having two fully integrated display projectors and a virtual keyboard projector, in accordance with an embodiment of the invention. In particular, as shown in FIG. 7A, the compact size portable personal computing device has a spring-loaded or pop-up projection head assembly 150, which can be deployed or activated by a user, using the slide switch 160, as per the upright position shown. In an embodiment, the compact laptop computer includes dual or two display projectors or projection systems 140 and 142, which in an embodiment, are mounted on opposite sides of the base portion 120 and towards a respective front (reference numeral 102) of the compact laptop computer for displaying the same image (for instance, image 185) on the screens 170 and 180. The dotted lines referencing the projection of the image 185 from the screen or display projectors 140 and 142 to the screen have been omitted for visual clarity. Further, as shown each of the display projectors 140 and 142 is configured to project an image from the compact laptop computer, where a processing unit of the compact laptop computer changes the output image projected onto the foldable display screens in response to one or more video signals received from a video card and in response to data inputted into the compact laptop computer, using a projected virtual keyboard image 152. In an embodiment, each of the dual or two display or screen projectors or projection systems 140 and 142 project an output image onto a screen in digital synchronization with each other, such that, a focused display of the output image is maintained on the screen. Similarly, a projected image can be displayed onto a wall instead of a screen, as discussed herein above with respect to FIG. 6. Further, focusing of each the display projectors can utilize a focusing technique, where a respective display projector displays a known image on the screen and scans the resulting output to determine if any changes need to be made to the image. For instance, each display projector would display a black square on a white background on the display screens and the respective image displayed would be viewed by respective optical sensors proximate to a respective display or screen projector to determine the size and shape of the projected image. Further, a respective display projector could show a first color image (e.g. a square) and the second display projector could show a second color image (in order to tell the two images apart), and where the respective settings can be adjusted until the respective images are perfectly aligned. Also, another factor to be considered for synchronization of the two display projectors is color saturation. Projectors have different color depths and, as such, the projectors must be tuned, so that a color looks the same on both projectors. For example, one display projector projects an image in a green color and the other display projector projects an image in the same color and then the settings are adjusted until both the colors look the same. In an embodiment, a transformer reads what is getting reflected back to it and the transformer compares the color levels reflected by the two numbers read and then can either increase or decrease the level of the color on a respective display projector, so that the colors have the same level. In an embodiment, this process is performed for each of the other two colors of the tri-color LED emitters or laser diodes. Additionally, having the two display projectors display the same image that is digitally synchronized, can provide a superimposed image that is twice as bright given that the brightness level between the two projectors has a cumulative effect. As such, each of the two display projectors can have half the power and half the brightness level for a given resolution, without compromising the brightness of the projected image. In an embodiment, each of the display projectors 140 and 142 include a respective spring-loaded tri-color LED emitter or a laser diode device that is configured to point at a proper angle for projecting an image onto the foldout display screens 170 and 180 of the compact laptop computer. In an embodiment, each of the respective spring-loaded tri-color LED emitter or a laser diode device is user configurable through the use of a Vernier-type thumb wheels and other calibration controls to ensure proper picture alignment. In the embodiment, each of the dual LED projection emitters is configured to share a same input signal from a video card output (for instance, video card, reference numeral 126 shown mounted within the base portion 120 of FIG. 5D). As such, the dual LED projection emitters would be effectively synchronized given that they share the same input signal from the video card output. Further, if one of the led or laser emitter's projection was physically blocked, the other emitter's projection would provide redundancy and maintain the display integrity without interruption. Turning to FIG. 7B, reference numeral 700B, depicts another embodiment of the fully opened compact size portable personal computing device having two fully integrated display projectors and a virtual keyboard projector shown in FIG. 7A, but with a sliding mechanism 134 for extending and retracting the lid portion 110 containing the display screens 170 and 180 away from and closer to the base portion 120 of the compact laptop computer. As shown in FIG. 7B, the compact laptop computer includes a sliding mechanism 134 for sliding the lid portion 110 away from the base portion 120 to an extended fixed position, such that, a greater distance is provided for the display projector 162 to properly focus and display an image 185 onto the display screens 170 and 180. In particular, as shown in FIG. 7B, the base portion 120 includes two bar members 134 that are configured to slide in and out of the base portion 120, such that, the display screen has two fixed positions. The first fixed position being a retracted fixed position or mode, where the bar members 134 are fully retracted into the base portion 120 (as shown in FIG. 7A) and a second fixed position or mode, where the bar members 134 are extended away from the base portion 120 of the compact laptop computer (as shown in FIG. 7B), thus, providing a greater distance for the display projector 162 to properly focus and display an image 185 onto the screens 170 and 180.

Figure 8A:
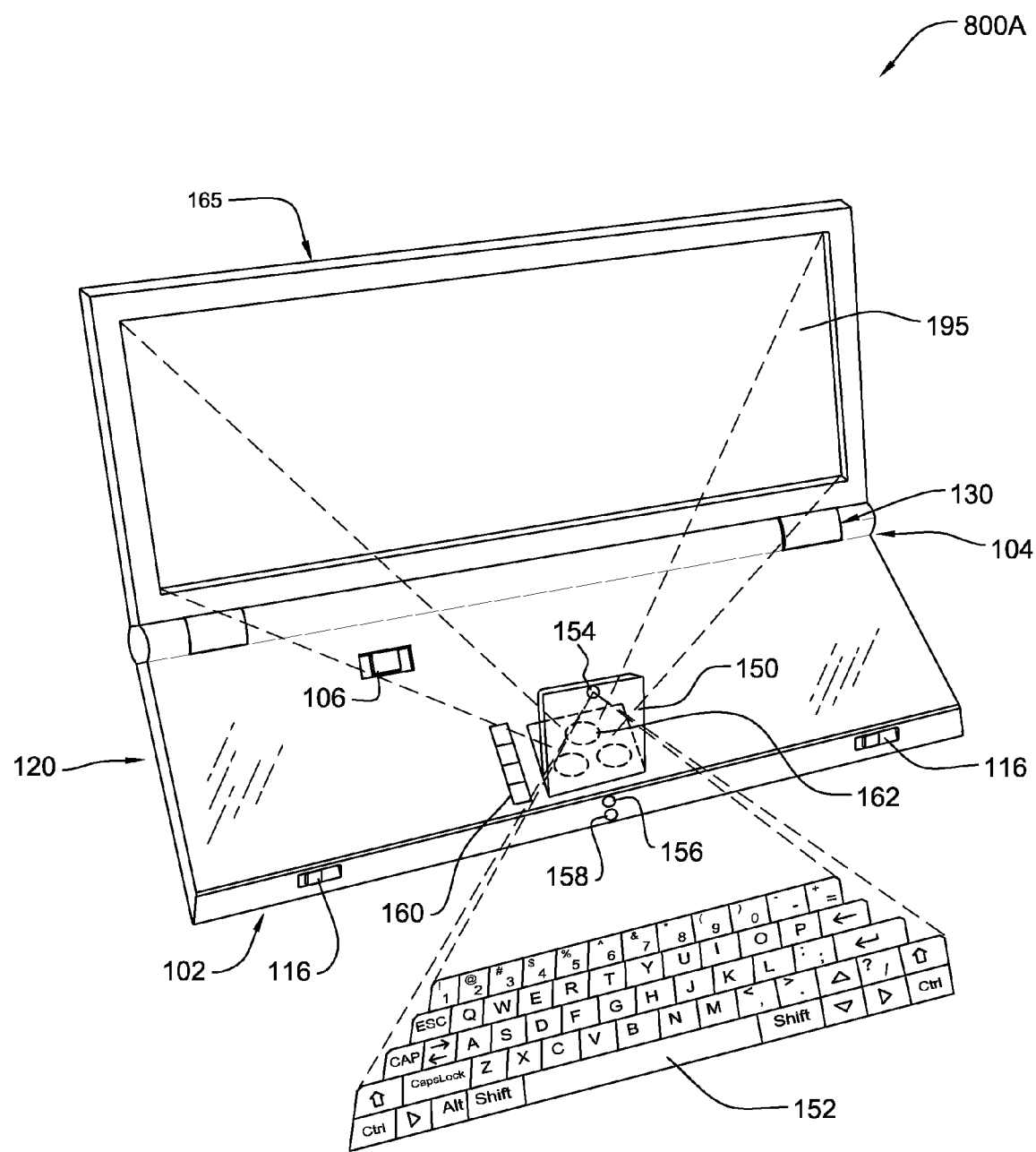
FIG. 8A depicts a perspective view of another embodiment of an opened compact laptop computer having a display projection system and a keyboard projection system, in accordance with an embodiment of the invention.
Figure 8B:
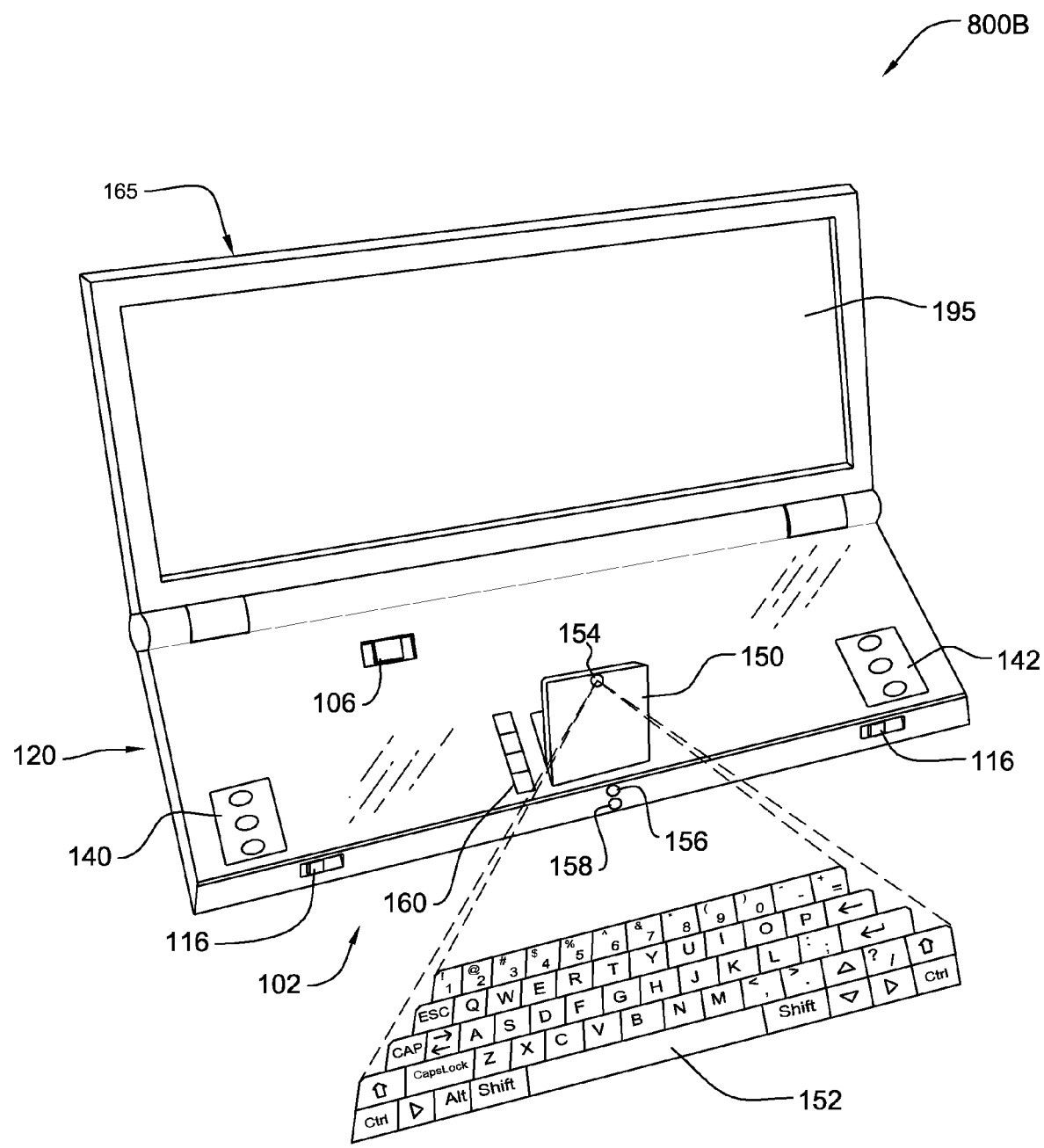
FIG. 8B depicts a perspective view of another embodiment of an opened compact laptop computer having dual display projection systems and a keyboard projection system, in accordance with an embodiment of the invention.

Reference is now made to FIGS. 8A and 8B, which depict respective perspective views of another embodiment of an opened compact size portable personal computing device having a computer base unit that includes a CPU, a video card and a memory component (not shown in FIGS. 8A and 8B, but described herein above with respect to FIG. 1B) and having a fully integrated display projector and a virtual keyboard projector, in accordance with an embodiment of the invention. Turning to FIG. 8A, FIG. 8A depicts a front perspective view diagram (reference numeral 800A) of the compact size portable personal computing device having a one-piece screen or lid portion 165 that is flipped open from the base portion 120. Further, FIG. 8B, reference numeral 800B, depicts another embodiment of an opened compact laptop computer having dual or two display projection systems and a keyboard projection system, in accordance with an embodiment of the invention. Further, as shown in FIGS. 8A and 8B, the screen is pivotally mounted to one side of the base unit and a screen or display projector is mounted to an opposite side of the base unit, where the screen projector is angled to project a computer generated image onto the screen. Further, the computer includes keyboard projector 154 for projecting a virtual keyboard 152, whereas, the computer shown in FIG. 8B further includes dual integrated display projectors 140 and 142, in accordance with an embodiment of the invention. For instance, a user of the compact laptop computer would unlatch the latching mechanism 116 to flip open the single piece lid portion 165 of the compact laptop computer or workstation, which includes a single screen panel (reference numeral 195). In particular, as shown in FIG. 8A, upon opening the lid portion 165 to an angle of approximately 90 degrees, the single screen panel (reference numeral 195) becomes visible to the user. As shown in FIGS. 8A and 8B, the lid portion 165 of the compact laptop computer is flipped upwards and approximately perpendicular (reference numeral 103) to the base portion 120. In an embodiment, the top lid portion 195 is rotatably or pivotally mounted (reference numeral 130) to a back (reference numeral 104) of the base portion 120, opposite from a front (reference numeral 102) of the compact laptop computer. As such, the embodiments shown in FIGS. 8A and 8B depict a compact computer that includes a single screen panel 195 with a single hinge mechanism between the base portion 120 and the lid portion 165 for opening and closing the laptop computer. Further, in an embodiment, the lid portion 195 is configured to open at an angle of approximately 180 degrees from the bottom or base portion 120, similar to that described herein above with respect to FIG. 6, but where the computer only has a single screen panel 195. The bottom or base portion 120, in an embodiment, comprises an on/off switch 106 configured to turn the compact laptop computer on and off. The base portion 120 further includes a projection head assembly 150, which includes a display projection system or display projector 162 and a virtual keyboard projection system or virtual keyboard projector 154, as discussed previously herein above with respect to FIG. 5A. In an embodiment, the base portion 120 includes a button or slide-switch 160 that is utilized by a user to activate or release the spring-loaded projection head assembly 150, which includes a keyboard projector or projection system 154, which in an embodiment, is configured to project (shown by dotted lines emanating from projector module 154) a keyboard image 152 to an input area in front of the compact laptop computer and proximate to a user, such that, a user can input data into the compact laptop computer, as previously discussed herein above. The details of the operation of the screen or display projector 162 will not be described here given that the operation details are similar to that described herein above with respect to FIG. 5A. Similarly, FIG. 8B, shows a laptop that has a spring-loaded or pop-up projection head assembly 150, which can be deployed or activated by a user, using the slide switch 160, as per the upright position shown. In an embodiment, the compact laptop computer includes dual or two display projectors or projection systems 140 and 142, which in an embodiment, are mounted on opposite sides of the base portion 120 and towards a respective front (reference numeral 102) of the compact laptop computer for displaying a same image (not shown) on the screen panel 195. Further, each of the display projectors 140 and 142 is configured to project an image (not shown in FIG. 8B) from the compact laptop computer, where a processing unit of the compact laptop computer changes the output image projected onto the single screen panel 195 in response to one or more video signals received from a video card and in response to data inputted into the compact laptop computer, using a projected virtual keyboard image 152. In an embodiment, each of the dual or two display or screen projectors or projection systems 140 and 142 project an output image (not shown) onto the single screen panel in digital synchronization with each other, such that, a focused display of the output image is maintained on the screen panel. The dotted lines referencing the projection of an image (not shown) from the screen or display projectors 140 and 142 to the screen have been omitted for visual clarity. Similarly, a projected image can be displayed onto a wall instead of a screen, as discussed herein above with respect to FIG. 6. Further, focusing of each the display projectors can utilize a focusing technique, where a respective display projector displays a known image on the screen and scans the resulting output to determine if any changes need to be made to the image. In an embodiment, the exterior surface of the computer laptop or workstation shown in FIGS. 8A and 8B are constructed of an eco-conforming Cycoloy C6600 resin, a blend of polycarbonate (PC) and acrylonitrile-butadiene-styrene (ABS), which provides durability and impact resistance, such as, plastics manufactured by General Electric Company. Alternatively, the exterior surface of the computer can be constructed of a rubberized metal, such as, those used in some laptop computers that are commercially available. Further, in an embodiment, the single screen panel 195 is manufactured using the GooSystems CRT White Topcoat Screen Goo, which is a specially formulated, color corrected, screen coating commercially available in liquid form. Alternatively, the single screen panel 195 can include a standard projection screen fabric that is adhered to the single screen panel 195. Further, although, not shown in FIGS. 8A and 8B, the lid portion 165 can be extended and retracted from the base portion 120, as described in other embodiments herein above.

Accordingly, the present invention provides a compact laptop computer whose size is reduced by approximately half by providing either a foldable screen (as shown in most of the embodiments, for instance, in FIGS. 3A and 3B) or a single screen panel (as shown in FIGS. 8A and 8B) and by replacing the keyboard with a virtual projection keyboard that can be used to input data. Further, a separate foldout plastic tray or panel could be unfolded or slid out of the base portion for serving as a projection surface to be "typed" upon, if no suitable projection surface is available. In addition, a user could plug in an external mouse for interacting with an image on the screen or could use the arrow keys on the projected keyboard to move a cursor on the screen. Furthermore, a user could plug in an external CD/DVD drive or second hard drive, if needed. Moreover, by having two screen or display projectors displaying the same image that is digitally synchronized, the displayed image shown on the screen is an image that is twice as bright as would have been with one display projector. Further, the two screen or display projectors also provide redundancy in the case where some object, for instance, a user's hands, etc. partially blocks some of one of the projector's path.

The foregoing descriptions of specific embodiments of the present invention have been presented for the purpose of illustration and description. They are not intended to be exhaustive or to limit the invention to the precise forms disclosed and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A portable computing device comprising:
 a processing unit for processing one or more program instructions;
 a video card for receiving one or more video signals;
 a foldable display having an opened up state for viewing information from said portable computing device, said foldable display having a closed down state for porting said computing device;
 a first projection system for projecting an input image for inputting data into said portable computing device, said first projection system projecting said input image in a downward direction in an area proximate to a front of said portable computing device when said foldable display is in said opened up state; and
 a second projection system for projecting an output image onto said foldable display of said portable computing device in said opened up state for viewing said output image, said second projection system projecting said output image in an upward direction and onto said foldable display in said opened up state, wherein said processing unit changes said output image projected onto said foldable display responsive to said one or more video signals received by said video card and said data inputted into said portable computing device using said input image.

2. The portable computing device according to claim 1, further comprising:
 a third projection system for projecting said output image onto said foldable display of said portable computing device in said opened up state, said third projection system projecting said output image in said upward direction and onto said foldable display in said opened up state, wherein said third projection system projects said output image in said upward direction in synchronization with said second projection system, and wherein said second projection system and said third projection system maintain a focused display of said output image onto said foldable display.

3. The portable computing device according to claim 2, wherein said foldable display comprises a first panel and a second panel, wherein said first panel is rotatably connected to a base portion of said portable computing device, wherein said second panel is rotatably connected at a top edge of said first panel, said top edge of said first panel being distal from said base portion of said portable computing device, wherein when said foldable display is in said opened up state, each of said first panel and said second panel is substantially perpendicular to said base portion of said portable computing device, and wherein when said foldable display is in said closed up state, said second panel folds onto said first panel, and said first panel having said second panel folded thereon, folds onto said base portion of said portable computing device.

4. The portable computing device according to claim 3, wherein said foldable display is unlatched and lifted to a position substantially perpendicular to said base portion, wherein said second panel is lifted upwards from said first panel to match an angle that said first panel of said foldable display forms with said base portion of said portable computing device, and wherein said foldable display is slidably mounted within said base portion to provide an extended display position and a retracted display position, said foldable display component being distanced from said base portion in said extended display position, and said foldable display component being proximate to said base portion in said retracted display position.

5. The portable computing device according to claim 4, wherein said first projection system is mounted onto said base portion of said portable computing device, and wherein said first projection system comprises an optical element for projecting said input image comprising a virtual laser keyboard image for inputting said data into said portable computing device, wherein said optical element comprises at least one of: a laser diode and a LED (Light Emitting Diode) emitter.

6. The portable computing device according to claim 5, wherein each of said second projection system and said third projection system is mounted onto said base portion of said portable computing device, and wherein each of said second projection system and said third projection system comprises an optical element for projecting said output image onto said foldable display, wherein said optical element comprises at least one of: a tricolor LED (Light Emitting Diode) emitter and a tricolor laser diode.

7. A portable computing device comprising:
a housing comprising a base portion and a lid portion, said base portion of said housing being configured to house one or more electronic portable computing device components, including a processing unit and a video card, said lid portion of said housing comprising a foldable display component for viewing information from said portable computing device, said foldable display component comprising a closed state and an open state, and said base portion of said housing further comprising:
a first projection system for projecting a virtual keyboard image for inputting data into said portable computing device, said first projection system being mounted onto said base portion of said housing, said first projection system projecting said virtual keyboard image in a downward direction in an area proximate to said base portion of said portable computing device and in front of said foldable display component when said foldable display component is in said open state; and
a second projection system for projecting an image onto said foldable display component of said portable computing device in said open state, said second projection system being mounted onto said base portion of said housing and projecting said image in an upward direction onto said foldable display component in said open state, wherein said virtual keyboard image projected downward and away from said foldable display component is used to input data into said portable computing device, wherein said processing unit changes said image projected onto said foldable display component responsive to one or more video signals received by said video card and said data inputted using said virtual keyboard image.

8. The portable computing device according to claim 7, further comprising:
a third projection system for projecting said image onto said foldable display component of said portable computing device in said open state, said third projection system being mounted onto said base portion of said housing and projecting said image in an upward direction onto said foldable display component in said open state, wherein said third projection system is mounted onto said base portion of said housing to project said image in said upward direction in synchronization with said second projection system, and wherein said third projection system shares a same input signal from a video card output of said video card of said portable computing device as said second projection system, and wherein said second projection system and said third projection system maintain a focused display of said image onto said foldable display component.

9. The portable computing device according to claim 8, wherein said foldable display component comprises a first panel and a second panel, wherein said first panel is rotatably connected to said base portion of said housing at said back edge, wherein said second panel is rotatably connected to said first panel at a top edge of said first panel when in said open state, said top edge being spaced apart from said back edge by said first panel, wherein when said foldable display component is in said open state, each of said first panel and said second panel is substantially perpendicular to said base portion and wherein when said foldable display component is in said closed state, said first panel lies in a plane substantially parallel to and proximate to said base portion and to said second panel.

10. The portable computing device according to claim 9, wherein said foldable display component is unlatched and lifted to a position substantially perpendicular to said base portion, wherein said second panel is lifted upwards from said first panel to match an angle that said first panel of said foldable display component forms with said base portion of said portable computing device, and wherein said foldable display component is slidably mounted within said base portion to provide an extended display position and a retracted display position, said foldable display component being distanced from said base portion in said extended display position, and said foldable display component being proximate to said base portion in said retracted display position.

11. The portable computing device according to claim 10, wherein when said foldable display component is in said closed state, said lid portion is equal to an area of said base portion of said portable computing device, and wherein when said foldable display component is in said open state, said lid portion is approximately twice said area of said base portion of said portable computing device.

12. The portable computing device according to claim 11, wherein said first projection system comprises an optical element for projecting a virtual laser keyboard image for receiving said input of said data into said portable computing device, and wherein said optical element comprises at least one of: a laser diode and a LED (Light Emitting Diode) emitter.

13. The portable computing device according to claim 12, wherein each of said second projection system and said third projection system comprises an optical element for projecting said output image onto said foldable display, and wherein said optical element comprises at least one of: a tricolor LED (Light Emitting Diode) emitter and a tricolor laser diode.

14. A computer workstation comprising:
a computer base unit including a CPU and a memory;
a screen pivotally mounted to one side of said base unit;
a screen projector mounted to an opposite side of said base unit, said screen projector being angled to project a computer generated image onto said screen; and a keyboard projector mounted to said opposite side of said base unit to project a keyboard onto a surface adjacent to said opposite side of said base unit.

15. The computer workstation according to claim 14, wherein said keyboard projector is mounted onto a pop-up assembly for projecting said keyboard in a downward direction onto said surface adjacent to said opposite side of said base unit, and wherein said screen is slidably mounted to said one side of said base unit to provide an extended display position and a retracted display position, said screen being distanced from said base unit in said extended display position, and said screen being proximate to said base unit in said retracted display position.

16. A computer workstation comprising:
a computer base unit including a CPU and a memory;
a screen pivotally mounted to one side of said base unit;
a first screen projector mounted to an opposite side of said base unit, said first screen projector being angled to project a first computer generated image onto said screen; and
a second screen projector mounted to said opposite side of said base unit, said second screen projector being angled to project onto said screen a second computer generated image substantially same as said first computer generated image projected by said first screen projector, wherein said first computer generated image and said second computer generated image are substantially superimposed on each another on said screen.

17. The computer workstation according to claim 16, wherein said second screen projector is mounted on one side of said opposite side of said base unit and said first screen projector is mounted on an opposite side of said opposite side of said base unit, and wherein said first screen projector and said second screen projector are in digital synchronization with each other to project the superimposed computer generated image onto said screen.

18. A portable computer comprising:
a computer base unit including a CPU and a memory;
a screen pivotally mounted to one side of said base unit;
a first screen projector mounted to an opposite side of said base unit, said first screen projector being angled to project a computer generated image onto said screen; and
a keyboard projector mounted to said opposite side of said base unit to project a keyboard image onto a surface adjacent to said opposite side of said base unit, said keyboard projector being mounted onto a pop-up assembly for projecting said keyboard image in a downward direction onto said surface adjacent to said opposite side of said base unit.

19. The portable computer according to claim 18, wherein said screen is foldable onto itself, and wherein said screen in a folded state mates with a top of said computer base unit, and wherein said screen in said folded state has approximately a same area as said top of said computer base unit.

20. The portable computer according to claim 19, wherein said screen is slidably mounted to said one side of said base unit to provide an extended display position and a retracted display position, wherein in said extended display position said screen is distanced from said base unit, and wherein in said retracted display position said screen is proximate to said base unit.

21. The portable computer according to claim 20, further comprising:
a second screen projector mounted to said opposite side of said base unit, said second screen projector being angled to project onto said screen a second computer generated image substantially same as the first said computer generated image projected by said first screen projector, and wherein said second screen projector is mounted on one side of said opposite side of said base unit and said first screen projector is mounted on an opposite side of said opposite side of said base unit, said first screen projector and said second screen projector being in digital synchronization with each other for projecting a superimposed computer generated image onto said screen.

22. The portable computer according to claim 21, wherein said keyboard projector comprises a first optical element for projecting a virtual laser keyboard image for receiving input of data into said portable computer, said first optical element comprising at least one of: a laser diode and a LED (Light Emitting Diode) emitter, wherein said first screen projector and said second screen projector comprises second and third respective optical elements for projecting said first and second computer generated images onto said screen, each of said second and third optical elements comprising at least one of: a tricolor LED (Light Emitting Diode) emitter and a tricolor laser diode.

* * * * *